United States Patent
Takahashi et al.

(10) Patent No.: US 9,494,284 B2
(45) Date of Patent: Nov. 15, 2016

(54) LIGHT SOURCE DEVICE AND ILLUMINATION APPARATUS

(71) Applicant: Sharp Kabushiki Kaisha, Osaka-shi, Osaka (JP)

(72) Inventors: Koji Takahashi, Osaka (JP); Yoshiyuki Takahira, Osaka (JP); Yosuke Maemura, Osaka (JP); Tomohiro Sakaue, Osaka (JP)

(73) Assignee: SHARP KABUSHIKI KAISHA, Osaka-shi (JP)

( * ) Notice: Subject to any disclaimer, the term of this patent is extended or adjusted under 35 U.S.C. 154(b) by 176 days.

(21) Appl. No.: 14/540,673

(22) Filed: Nov. 13, 2014

(65) Prior Publication Data
US 2015/0252964 A1 Sep. 10, 2015

(30) Foreign Application Priority Data

Mar. 5, 2014 (JP) ................................ 2014-043162

(51) Int. Cl.
| | |
|---|---|
| *F21K 99/00* | (2016.01) |
| *F21V 9/16* | (2006.01) |
| *F21S 8/10* | (2006.01) |
| *F21Y 101/02* | (2006.01) |

(52) U.S. Cl.
CPC .............. *F21K 9/56* (2013.01); *F21S 48/1145* (2013.01); *F21V 9/16* (2013.01); *F21Y 2101/025* (2013.01)

(58) Field of Classification Search
CPC ........ F21K 9/56; F21S 48/1145; F21V 9/16; F21Y 2101/025
See application file for complete search history.

(56) References Cited

U.S. PATENT DOCUMENTS

| | | |
|---|---|---|
| 2008/0218664 A1 | 9/2008 | Imamura et al. |
| 2011/0216550 A1 | 9/2011 | Koike et al. |
| 2012/0314442 A1* | 12/2012 | Takahashi ............ F21S 48/1145 362/538 |
| 2013/0257264 A1 | 10/2013 | Tamaki et al. |

FOREIGN PATENT DOCUMENTS

| | | |
|---|---|---|
| JP | 2008-226492 | 9/2008 |
| JP | 2009-44137 | 2/2009 |
| JP | 2011-181381 | 9/2011 |
| JP | 2012-114040 | 6/2012 |
| JP | 2013-229438 | 11/2013 |

* cited by examiner

*Primary Examiner* — Stephen F Husar
(74) *Attorney, Agent, or Firm* — Morrison & Foerster LLP

(57) ABSTRACT

In a light emitting section, a phosphor layer including a first phosphor particle which receives excitation light and emits fluorescence with a first peak wavelength and a phosphor layer including a second phosphor particle which receives the excitation light and emits fluorescence with a second peak wavelength are stacked. In the light emitting section, when an upper surface is a surface from which illumination light is mostly emitted, the illumination light including the fluorescence emitted from the first phosphor particle and the fluorescence emitted from the second phosphor particle, a reflective member to reduce leakage of fluorescence is provided on a side surface of the light emitting section.

15 Claims, 12 Drawing Sheets

D2: ENLARGED VIEW

D1: ENLARGED VIEW

D2:ENLARGED VIEW

D3:ENLARGED VIEW

D4: ENLARGED VIEW

D5: ENLARGED VIEW

D6:ENLARGED VIEW

LIGHT SOURCE DEVICE AND ILLUMINATION APPARATUS

CROSS-REFERENCE TO RELATED APPLICATION

This nonprovisional application claims priority under 35 U.S.C. §119 on Japanese Patent Application No. 2014-043162 filed on Mar. 5, 2014, the entire contents of which is hereby incorporated by reference.

FIELD OF THE INVENTION

The present disclosure relates to a light source device including a phosphor that emits fluorescence by receiving excitation light and to an illumination apparatus.

BACKGROUND OF THE INVENTION

In recent years, various light source devices have been developed which use a semiconductor light emitting element such as a laser diode as an excitation light source.

The light source device can be configured to irradiate a light emitting section including a plurality of phosphor particles from which light with different peak wavelengths is emitted, with excitation light from an excitation light source, and thus fluorescence of each of plural colors is emitted from the light emitting section. White light including the fluorescence of each of plural colors (for example, red, green, and blue) can be emitted from the light source device as illumination light.

Japanese Unexamined Patent Application Publication No. 2012-114040 (published on Jun. 14, 2012) describes a light source device capable of improving a color reproduction property. A light emitting section (phosphor section) is formed by stacking a plurality of layers, each layer having a phosphor material emitting fluorescence of a corresponding color in the light source device of Japanese Unexamined Patent Application Publication No. 2012-114040.

The expression "having a low color reproduction property" described in Japanese Unexamined Patent Application Publication No. 2012-114040 means a problem in that it is difficult to accurately reproduce the color of an object irradiated with white light, since bluish green light or red light are insufficiently emitted in the light-emitting spectrum of white light (refer to the paragraph [0040] in Japanese Unexamined Patent Application Publication No. 2012-114040).

Japanese Unexamined Patent Application Publication No. 2013-229438 (published on Nov. 7, 2013) describes a light source device which has a color conversion molding with small limitation on thickness or shape.

Japanese Unexamined Patent Application Publication No. 2011-181381 (published on Sep. 15, 2011) describes a light source device in which it is possible to suppress color variation in emitted light resulting from blue laser light radiated from a laser light source and reflected by a metal plate surface having no phosphor around the phosphor (to suppress a circumference of a light distribution pattern being blue-colored).

Japanese Unexamined Patent Application Publication No. 2008-226492 (published on Sep. 25, 2008) and Japanese Unexamined Patent Application Publication No. 2009-44137 (published on Feb. 26, 2009) describe light emitting devices in which a light emitting section is formed by stacking a plurality of layers, each layer having a phosphor material, as in Japanese Unexamined Patent Application Publication No. 2012-114040.

There is a case where uneven white light is obtained when excitation light excites a light emitting section in the light source device in which white light is obtained as illumination light by mixing fluorescence of a plurality of different light-emitting peak wavelengths from each other.

However, a structure for suppressing variation of the illumination light on a surface of the light emitting section is neither described nor suggested in Japanese Unexamined Patent Application Publication No. 2012-114040, Japanese Unexamined Patent Application Publication No. 2013-229438, Japanese Unexamined Patent Application Publication No. 2008-226492, or Japanese Unexamined Patent Application Publication No. 2009-44137. A structure for suppressing variation of the illumination light resulting from reflection of blue laser light on a surface of a metal plate around the phosphor section is disclosed, but a structure for suppressing variation of the illumination light resulting from a plurality of phosphor materials is neither described nor suggested in Japanese Unexamined Patent Application Publication No. 2011-181381.

Accordingly, there is a concern that it is difficult to suppress variation of the illumination light in the light emitting device having a light emitting section formed of a plurality of phosphor materials.

SUMMARY OF THE INVENTION

It is desirable to provide a light source device capable of suppressing variation of illumination light in a light emitting section including a plurality of phosphor materials.

According to an aspect of the disclosure, there is provided a light source device including a light emitting section formed by stacking a first layer and a second layer, the first layer including a first phosphor particle which receives excitation light and emits fluorescence with a first peak wavelength, and the second layer including a second phosphor particle which receives the excitation light and emits fluorescence with a second peak wavelength different from the first peak wavelength. Light including the fluorescence emitted by the first phosphor particle and the fluorescence emitted by the second phosphor particle is emitted as illumination light, a surface of the light emitting section from which the illumination light is mostly emitted is defined as an upper surface, and a shielding member is provided on a side surface with respect to the upper surface of the light emitting section, and reduces leakage of fluorescence from the side surface.

DETAILED DESCRIPTION OF THE INVENTION

Embodiment 1 according to the present disclosure will be described as follows with reference to FIGS. 1 to 2C.

Figure 1:
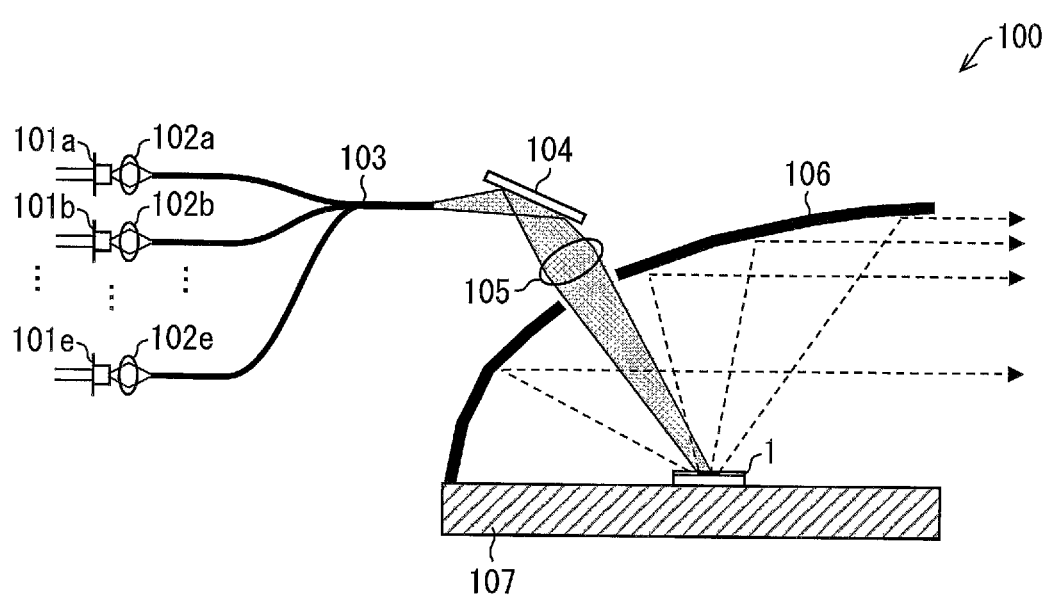
FIG. 1 is a schematic view illustrating a structure of an illumination apparatus according to Embodiment 1 of the present disclosure.

FIG. 1 is a schematic view illustrating a structure of an illumination apparatus (light source device) 100 according to this embodiment. The illumination apparatus 100 includes a fluorescence emitting section (light emitting section) 1, semiconductor lasers (excitation light sources) 101a to 101e, convex lenses 102a to 102e, an optical fiber 103, a reflecting mirror 104, a convex lens 105, a reflector (optical transmission system) 106, and a metal base 107.

The illumination apparatus 100 is configured to transmit fluorescence emitted from the fluorescence emitting section 1 through the reflector 106 in a predetermined direction. The illumination apparatus 100 is suitable for a vehicle headlight, a spotlight or the like.

The semiconductor lasers 101a to 101e are five excitation light sources which emit excitation light for exciting the phosphor particles included in the fluorescence emitting section 1. Each of the semiconductor lasers 101a to 101e emits laser light having a wavelength of 405 nm and an output of 1 W as excitation light.

That is, each of the semiconductor lasers 101a to 101e is a semiconductor light emitting element which laser-oscillates at a wavelength of 405 nm. Light with a wavelength of 405 nm has a low luminosity factor, and it is difficult to see the light with human eyes.

The wavelength of excitation light emitted from the semiconductor lasers 101a to 101e may be appropriately selected according to an excitation wavelength of the phosphor particles included in the fluorescence emitting section 1. The number or the output of the semiconductor lasers 101a to 101e may be appropriately selected according to the specification of the illumination apparatus 100.

Furthermore, a heat radiating mechanism such as a heat sink or a cooling tool (not illustrated in FIG. 1) may be provided in the semiconductor lasers 101a to 101e so as to radiate heat generated during the operation of the semiconductor lasers 101a to 101e.

A power supply system for operating the semiconductor lasers 101a to 101e is not illustrated in FIG. 1, but is connected to the semiconductor lasers 101a to 101e.

Each of the convex lenses 102a to 102e concentrates excitation light emitted from the semiconductor lasers 101a to 101e. For example, the convex lens 102a concentrates excitation light emitted from the semiconductor laser 101a.

The excitation light concentrated by the convex lenses 102a to 102e is incident on an incident end of the optical fiber 103. Five optical fibers are provided to take in the excitation light concentrated by the convex lenses 102a to 102e.

The optical fiber 103 in this embodiment is bundled up on an emitting end side of the five optical fibers. The semiconductor lasers 101a to 101e are optically coupled with the optical fiber 103 through the convex lenses 102a to 102e. The excitation light concentrated by the convex lenses 102a to 102e is emitted from an emitting end of the optical fiber 103 to the reflecting mirror 104.

The reflecting mirror 104 reflects the excitation light. The excitation light reflected by the reflecting mirror 104 is incident on the convex lens 105. The convex lens 105 concentrates the reflected excitation light.

The reflector 106 has a through hole for allowing the excitation light concentrated by the convex lens 105 to pass through. The excitation light concentrated by the convex lens 105 passes through the through hole provided in the reflector 106, and is incident on the fluorescence emitting section 1. A structure of the fluorescence emitting section 1 will be described below in detail.

In this manner, the fluorescence emitting section 1 is irradiated with the excitation light emitted from the semiconductor lasers 101a to 101e. The phosphor particles included in the fluorescence emitting section 1 are excited by the excitation light, and then the fluorescence is emitted from the fluorescence emitting section 1.

The reflector 106 is a concave mirror which reflects the fluorescence emitted from the fluorescence emitting section 1 in a predetermined direction. The reflector 106 reflects the fluorescence emitted from the fluorescence emitting section 1 toward the front of the illumination apparatus 100 (in a direction to which an opening portion of the reflector 106 is directed).

In other words, the reflector 106 is an optical transmission system which transmits the fluorescence emitted from the fluorescence emitting section 1 in a desired direction. A reflecting surface of the reflector 106, for example, has a curved shape such as a paraboloid of revolution.

A structure in which the reflector 106 includes the through hole is illustrated in this embodiment, but the reflector 106 without the through hole may be provided. For example, a part of the reflector 106 may be configured to have light transmission properties, and the excitation light concentrated by the convex lens 105 can be incident on the fluorescence emitting section 1.

The metal base 107 is provided to support the fluorescence emitting section 1. The metal base 107 also supports the reflector 106 in addition to the fluorescence emitting section 1 in the illumination apparatus 100.

The illumination apparatus 100 is illustrated in which the fluorescence emitting section 1 is irradiated with the excitation light emitted from the semiconductor lasers 101a to 101e through an optical system formed of the optical fiber 103 and the like. However, any known optical system may be applied as the optical system for irradiation of the fluorescence emitting section 1 with the excitation light emitted from the semiconductor lasers 101a to 101e.

In the illumination apparatus 100, the configuration in which the reflector 106 having a concave mirror is used is illustrated as the optical transmission system. However, the optical transmission system may be configured as other configurations such as a projector type optical transmission system which employs a reflector and a convex lens, and a direct projection type optical transmission system which uses only a convex lens to project the light source image of the fluorescence emitting section.

Figure 2A:
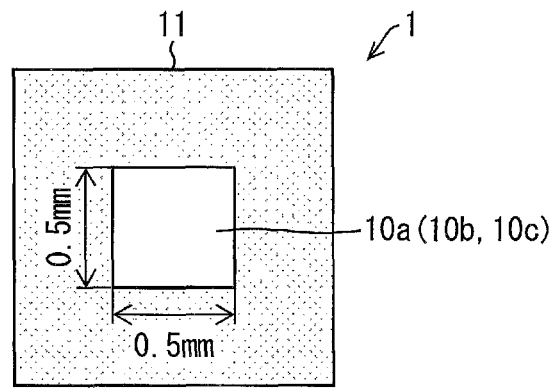
FIG. 2A is a top view of a fluorescence emitting section according to Embodiment 1 of the present disclosure.
Figure 2B:
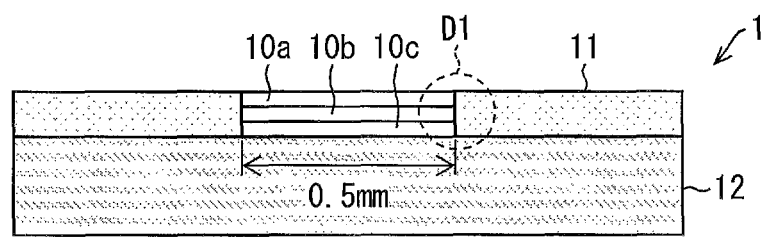
FIG. 2B is a cross-sectional side view of the fluorescence emitting section.
Figure 2C:
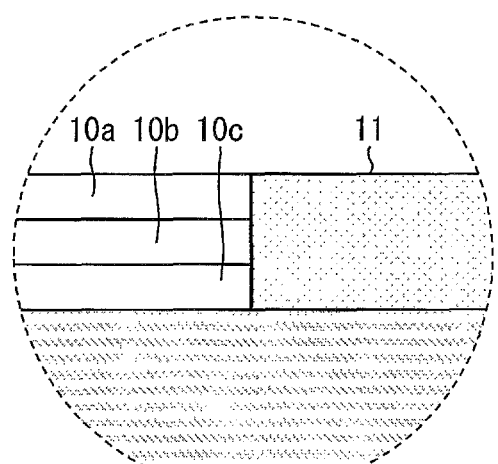
FIG. 2C is an enlarged view of a part of the cross-sectional side view illustrated in FIG. 2B.

FIGS. 2A to 2C are diagrams showing a structure of the fluorescence emitting section 1. FIG. 2A is a top view of the fluorescence emitting section 1. FIG. 2B is a cross-sectional side view of the fluorescence emitting section 1. FIG. 2C is an enlarged view of a part (D1) of the cross-sectional side view illustrated in FIG. 2B.

The fluorescence emitting section 1 includes three phosphor layers of a phosphor layer (first layer) 10a, a phosphor layer (second layer) 10b, and a phosphor layer 10c, as illustrated in FIG. 2B. The phosphor layers 10a, 10b and 10c are stacked in order from the upper side.

Here, the upper side is a side farthest from a metal substrate 12 in the fluorescence emitting section 1. In other words, the upper side means a side of the surface from which the illumination light including the fluorescence is mostly emitted in the fluorescence emitting section 1 among the widest surfaces of the fluorescence emitting section 1 facing each other. The phosphor layer 10a is the uppermost layer and is also referred to as the top layer of the phosphor layers. Accordingly, the reflector 106 is provided as the optical transmission system, and faces the top phosphor layer 10a of fluorescence emitting section 1 in the illumination apparatus 100.

The terms "upper side" and "top layer" not necessarily mean a positional relationship in a vertical direction in the present disclosure.

The phosphor layer 10a which is the top layer (first layer) includes a blue light emitting phosphor particle (first phosphor particle) (BAM (EU-activated $BaMaAl_{10}O_{17}$) phosphor). The phosphor layer 10a has an average layer thickness of 40 μm. BAM phosphor emits blue fluorescence with a peak wavelength (first peak wavelength) of about 455 nm.

The phosphor layer 10b which is a lower layer (second layer) includes a green light emitting phosphor particle (second phosphor particle) (β-SiAlON phosphor). The phosphor layer 10b has an average layer thickness of 20 μm. β-SiAlON phosphor emits green fluorescence with a peak wavelength (second peak wavelength) of about 540 nm.

The phosphor layer 10c which is a further lower layer includes a red light emitting phosphor particle (third phosphor particle) (CASN (Eu-activated $CaAlSiN_3$) phosphor). The phosphor layer 10c has an average layer thickness of 20 μm. CASN phosphor emits red fluorescence with a peak wavelength (third peak wavelength) of about 650 nm.

The phosphor layers 10a, 10b and 10c respectively include single phosphor particles, as described above. The phosphor layers 10a, 10b and 10c may have the same average layer thickness.

The first peak wavelength, the second peak wavelength and the third peak wavelength are different from each other. As long as phosphor particles which emit fluorescence with substantially the same peak wavelength are included, different types of plural phosphor particles may be respectively mixed in the phosphor layers 10a, 10b and 10c. This is true for Embodiments 2 to 6 described below.

For example, two types of blue phosphor particles may be mixed to be included as the first phosphor particle in the phosphor layer 10a, and the two types of blue phosphor particles have substantially the same peak wavelength as the first peak wavelength and emit blue fluorescence.

Each of the phosphor layers 10b and 10c, different from the top phosphor layer 10a, may be referred to as the second layer. In this case, each of the second peak wavelength and the third peak wavelength may collectively be referred to as the second peak wavelength. The second phosphor particle and the third phosphor particle may collectively be referred to as the second phosphor particle.

A binding agent formed of a glass having a low melting point binds phosphor particles having a diameter of about 10 μm or less to each other or binds the phosphor particles and a base material in the phosphor layers 10a, 10b and 10c.

There is a case where property degradation such as discoloration (yellowing) and carbonization of organic substances occurs when the organic substances are irradiated with laser light. Accordingly, the phosphor layers 10a, 10b and 10c are manufactured not to include organic substances in order to reduce property degradation due to irradiation with the excitation light.

The respective phosphor layers 10a, 10b and 10c have an average layer thickness larger than the diameter of the phosphor particles included therein. The phosphor particles may have a diameter of 5 μm to 15 μm in order to greatly improve luminous efficiency.

The phosphor layers 10a, 10b and 10c are configured such that it is difficult to see the lower phosphor layers from the upper phosphor layer. For example, as illustrated in FIG. 2A, only the phosphor layer 10a is seen, and the phosphor layers 10c and 10b are not seen when the phosphor layer 10a is viewed from the upper side.

In other words, the top phosphor layer 10a completely covers the lower phosphor layers 10b and 10c. Accordingly, the phosphor particles included in the phosphor layer 10b and the phosphor particles included in the phosphor layer 10c are not seen through a gap between the phosphor particles included in the phosphor layer 10a. Here, the phosphor particles are arranged in the phosphor layers 10a, 10b and 10c such that it is difficult to see the phosphor layer below one phosphor layer from the one phosphor layer.

The thickness of the upper phosphor layer may be twice the diameter of the phosphor particle or more, considering that the upper phosphor layer may have a structure in which at least two phosphor particles are stacked, such that the lower phosphor layer is not seen from the upper phosphor layer.

As illustrated in FIG. 2A, an upper surface of the phosphor layers 10a, 10b and 10c has a rectangular shape of 0.5 mm×0.5 mm.

As illustrated in FIG. 2B, side surfaces (circumference) of the phosphor layers 10a, 10b and 10c are covered by a reflective member 11 (shielding member). FIG. 2C is an enlarged view of a region D1 in the vicinity of an interface between (i) the phosphor layers 10a, 10b and 10c, and (ii) the reflective member 11 in FIG. 2B.

The reflective member 11 is a member mainly formed of a white glass including $TiO_2$ (titanium dioxide). The phosphor layers 10a, 10b and 10c, and the reflective member 11 are formed on the surface of the metal substrate 12. The metal substrate 12 is formed of, for example, aluminum.

As illustrated in FIGS. 2A to 2C, only the top phosphor layer 10a is exposed from an opening portion of the reflective member 11.

The entire surface of the phosphor layer 10a is uniformly irradiated with the excitation light from the semiconductor lasers 101a to 101e, and thus the phosphor particles included in the respective phosphor layers 10a, 10b and 10c are excited.

Accordingly, (i) blue fluorescence emitted from the phosphor layer 10a, (ii) green fluorescence emitted from the phosphor layer 10b, and (iii) red fluorescence emitted from the phosphor layer 10c are mixed to obtain uniform white light in the process of being emitted from the upper surface of the fluorescence emitting section 1 and reaching the eyes of an observer. The white light is used as illumination light emitted from the illumination apparatus 100.

As a method for forming the phosphor layers 10a, 10b and 10c which are thin films including phosphor particles, a method can be used in which the phosphor layer is directly formed on the surface of the metal substrate 12 as a support substrate by using various methods such as sedimentation, a printing technique, and a transferring technique on phosphor particles mixed with glass particles which are a fundamental component of the binding agent.

The phosphor layers 10a, 10b and 10c can be formed by the plate-shaped light emitting section obtained by being sintered into a ceramic form, which is attached to the metal substrate 12 or is independently provided.

The phosphor layers 10a, 10b and 10c can be formed by performing a similar process on the plate-shaped light emitting section obtained by using a method of dispersing phosphor particles in a glass or a resin, or the like. Similarly to this embodiment, the phosphor layers can be formed in embodiments to be described below.

Problems occurring in an illumination apparatus of the related art will be described before describing the effect of the illumination apparatus 100 according to this embodiment.

In the illumination apparatus of the related art, a fluorescence emitting section can be configured in such a manner that plural types of phosphor particles are mixed in one phosphor layer when the fluorescence emitting section is excited by laser light to obtain white light.

In this case, a plurality of the phosphor particles are randomly distributed in which light emitting colors are different. Particularly, a plurality of the phosphor particles of the plural types are randomly exposed on an upper surface of the phosphor layer when the fluorescence emitting section is viewed from an upper surface thereof since the plural types of phosphor particles are randomly positioned in one phosphor layer.

If the upper surface of the fluorescence emitting section is irradiated with laser light, the plural types of phosphor particles are excited which are randomly disposed on the top surface of the phosphor layers. Accordingly, variation in gradation of white light or chromaticity of the white light occurs in the surface, corresponding to random disposition of the plural types of phosphor particles.

The gradation of white light means that luminance distribution of the white light occurs in the surface.

When the size of the phosphor layer is comparatively large (equal to or more than about several mm), the size of the phosphor particles included in the phosphor layer is relatively small in comparison to the size of the phosphor layer.

Thus, distribution of plural types of fluorescence on the upper surface of the fluorescence emitting section is comparatively unaffected by random disposition of the phosphor particles included in the top surface of the phosphor layers. Accordingly, the entirety of the fluorescence emitted by the plural types of phosphor particles can be observed as the white light when being observed from the upper surface of the fluorescence emitting section.

On the other hand, when the size of the phosphor layer is comparatively small (equal to or less than about 1 mm), it is difficult to ignore the size of the phosphor particles included in the phosphor layer in comparison to the size of the phosphor layer.

Thus, the plural types of fluorescence on the upper surface of the fluorescence emitting section have unevenness in color distribution in which distribution of the phosphor particles included in the top surface of the phosphor layers is mirrored.

Accordingly, illumination light emitted from the illumination apparatus is largely influenced by a light emitting pattern in which distribution of the plural types of fluorescence on the top surface of the phosphor layers is mirrored. Particularly, it is difficult to ignore the influence of the light emitting pattern and a problem occurs in that variation of the illumination light is generated in a case of using an illumination apparatus having a structure in which luminance distribution on the upper surface of the fluorescence emitting section (near field pattern in light-emitting) is enlarged and projected as it is.

As described above, in the illumination apparatus of the related art, a plurality of the phosphor particles with different light-emitting colors are randomly distributed on a surface of a light emitting section, and then variation in the gradation of white light or chromaticity of the white light occurs in the surface when excitation light excites the light emitting section.

Furthermore, unevenness in color distribution occurs on the surface of the light emitting section (near field pattern in light-emitting) particularly in association with random exposure of the plural phosphor particles with different light-emitting colors when the size of the entire light emitting section decreases to a degree that it is difficult to ignore the size of the phosphor particles. That is, a situation occurs in which the colors are insufficiently mixed with each other.

Here, "variation of illumination light" means a state where white light becomes varied. Specifically, "variation of illumination light" may be understood as a state where variation in gradation of white light occurs in the surface, a state where variation in chromaticity of white light occurs in the surface, a state where a plurality of color components which constitute the white light are insufficiently mixed with each other, and the like.

Variation on a surface of a light source is not a serious problem in an application in which light from the light source is sufficiently diffused and used. However, variation in a near field pattern of the light source becomes a serious problem since variation in a projected image follows the variation in a near field pattern of the light source in consideration of an application in which a lens or the like is used and an image of the light source is enlarged and projected.

Effect of Illumination Apparatus 100

According to the illumination apparatus 100 of this embodiment, it is possible to reduce the probability of the above-mentioned problem occurring in the illumination apparatus of the related art.

In the illumination apparatus 100, the fluorescence emitting section 1 includes the following (Configuration A) to (Configuration C): (Configuration A) a plurality of the phosphor layers 10a, 10b and 10c are stacked in such a manner that the phosphor layer 10a including one type of phosphor particles is disposed as the top layer; (Configuration B) the excitation light excites the entire upper surface of the phosphor layer 10a; and (Configuration C) fluorescence which is emitted from the side surfaces of the phosphor layers 10a, 10b and 10c is shielded. The upper surface of the phosphor layer 10a means a surface that constitutes the upper surface of the fluorescence emitting section 1.

Through (Configuration A), the top phosphor layer 10a emits fluorescence (blue fluorescence having a first peak wavelength) which is one wavelength component constituting white light, and serves to scatter fluorescence (green fluorescence having a second peak wavelength, and red fluorescence having a third peak wavelength) which is emitted from the lower phosphor layers 10b and 10c.

Through (Configuration B), the upper surface of the phosphor layer 10a is almost uniformly excited. Through (Configuration C), the fluorescence which is emitted from the lower phosphor layers 10b and 10c is not emitted outwardly from the side surface of the fluorescence emitting section 1.

Accordingly, through (Configuration A) to (Configuration C), when the fluorescence emitting section 1 is viewed from the upper surface thereof, white light is observed which is obtained by almost uniformly mixing plural colors in the entire upper surface of the phosphor layer 10a.

In (Configuration B), the entire upper surface of the phosphor layer 10a may be irradiated with the excitation light having uniform intensity. However, depending on the use of the illumination apparatus 100, there is a case where the entire upper surface of the phosphor layer 10a might not be irradiated with the excitation light. But, generally speaking, it is desirable that the entire upper surface of the phosphor layer 10a be irradiated with the excitation light so as to further suppress the variation of the illumination light.

To realize (Configuration C), the side surfaces of the phosphor layers 10a, 10b and 10c are covered with the reflective member 11 in the fluorescence emitting section 1.

When the side surfaces of the phosphor layers 10a, 10b and 10c are exposed, fluorescence with a corresponding color is separately emitted from the respective side surfaces of the phosphor layers 10a, 10b and 10c.

Thus, when the fluorescence emitting section is viewed from the upper surface thereof in which the side surfaces of the phosphor layers 10a, 10b and 10c are exposed, a portion may be present in which the colors of fluorescence are insufficiently mixed in an end portion of the fluorescence emitting section 1.

However, the fluorescence emitting section 1 according to this embodiment includes (Configuration C) in addition to the above-described (Configuration A) and (Configuration B). Therefore, it is difficult for the fluorescence to be emitted from the end portion of the fluorescence emitting section 1.

Accordingly, a portion in which the colors of fluorescence are insufficiently mixed is not present in the end portion of the fluorescence emitting section 1, and it is possible to more effectively suppress the variation of the illumination light in the fluorescence emitting section 1, unlike in the fluorescence emitting section of the related art.

The fluorescence which reaches the phosphor layers 10a, 10b and 10c is not emitted from the side surfaces thereof and is reflected and returns to the inside of the phosphor layers 10a, 10b and 10c. Accordingly, the light-emitting form of the fluorescence emitting section 1 is a desired form, and the luminous efficiency thereof is improved.

As described above, according to the illumination apparatus 100, the reflective member 11 covers the side surfaces of the phosphor layers 10a, 10b and 10c which are stacked in order from the upper side, and thus it is possible to uniformly and economically take out white light as illumination light from the upper surface of the fluorescence emitting section 1 in the fluorescence emitting section 1.

According to the illumination apparatus 100, the effect is achieved by which it is possible to obtain the illumination light having the suppressed variation from a light emitting section including a plurality of the phosphor layers 10a, 10b and 10c, that is, the fluorescence emitting section 1.

As described above, the top phosphor layer 10a serves to scatter the fluorescence emitted from the lower phosphor layers 10b and 10c. To facilitate scattering of the fluorescence, the top phosphor layer 10a may be larger than the lower phosphor layers 10b and 10c in thickness. That is, the top phosphor layer 10a may be the thickest among the phosphor layers 10a, 10b and 10c of the fluorescence emitting section 1.

In other words, a phosphor layer including phosphor particles with the largest volume fraction may be disposed as the top phosphor layer 10a among the plurality of the phosphor layers provided to emit white illumination light.

For example, the phosphor layer 10a which emits blue fluorescence has an average layer thickness of 40 µm, the phosphor layer 10b which emits green fluorescence has an average layer thickness of 20 µm, and the phosphor layer 10c which emits red fluorescence has an average layer thickness of 20 µm in the fluorescence emitting section 1.

Accordingly, the ratio of the phosphor layers 10a, 10b and 10c in average layer thickness is 4:2:2, and the phosphor layer 10a is the thickest phosphor layer. The ratio of the respective phosphor layers in average layer thickness corresponds to the volume fraction of the phosphor particles in the fluorescence emitting section 1. That is, blue light emitting phosphor particles, green light emitting phosphor particles and red light emitting phosphor particles are mixed at the ratio of 4:2:2 to obtain white light as desired illumination light in the fluorescence emitting section 1.

The phosphor layer 10a which includes blue light emitting phosphor particles with the largest volume fraction is used as the top phosphor layer in the fluorescence emitting section 1. With this structure, it is possible to facilitate the scattering of the fluorescence emitted from the lower phosphor layers 10b and 10c.

A surface on which excitation light is mostly incident is the same as a surface from which fluorescence is mostly emitted to the outside (that is, the upper surface of the top phosphor layer 10a) in the fluorescence emitting section 1 according to this embodiment. This structure of the fluorescence emitting section is referred to as a reflection type light emitting section.

The reflection type light emitting section can take fluorescence out in a surface on which excitation light is incident (that is, a surface in which optical density of the excitation light is highest), and thus improve luminous efficiency.

It is possible to use as a heat sink a metal substrate, and a high thermal conductive ceramics substrate or the like for supporting the light emitting section in the reflection type light emitting section. For this, it is possible to effectively radiate heat generated resulting from that laser light which excites the light emitting section.

The fluorescence emitting section 1 is the reflection type light emitting section, and thus it is possible to effectively radiate heat generated from the upper surface of the fluorescence emitting section 1 to the metal substrate 12 on a bottom surface thereof. For increasing this heat-radiating effect, the fluorescence emitting section 1 may be thinly formed.

In order for the fluorescence emitting section 1 to be thinly formed, and configured such that the top phosphor layer 10a completely covers the lower phosphor layers 10b and 10c, phosphor particles included in the phosphor layers may be disposed at high density.

The respective phosphor layers 10a, 10b and 10c are illustrated as a phosphor layer including single phosphor particles having a fixed size in Embodiment 1. However, the respective phosphor layers 10a, 10b and 10c may be formed in which phosphor particles with different sizes are mixed.

For example, the respective phosphor layers 10a, 10b and 10c may be formed in which phosphor particles having three sizes, d50=10 μm, d50=3 μm, and d50=1 μm are mixed. Here, d50 indicates a median diameter of the phosphor particles.

In this case, for example, phosphor particles with a diameter of 3 μm or 1 μm may be buried in a gap occurring when phosphor particles with a diameter of 10 μm are disposed in line in the respective phosphor layers 10a, 10b and 10c.

Thus, it is possible to dispose phosphor particles included in the respective phosphor layers 10a, 10b and 10c at high density, and it is possible to form the fluorescence emitting section 1 thinly.

Another embodiment of the present disclosure will be described as follows with reference to FIGS. 3 to 4C. For a convenient description, members are denoted by the same reference numerals, which have the same function as the above-described members in the above embodiment, and description thereof will be omitted.

Figure 3:
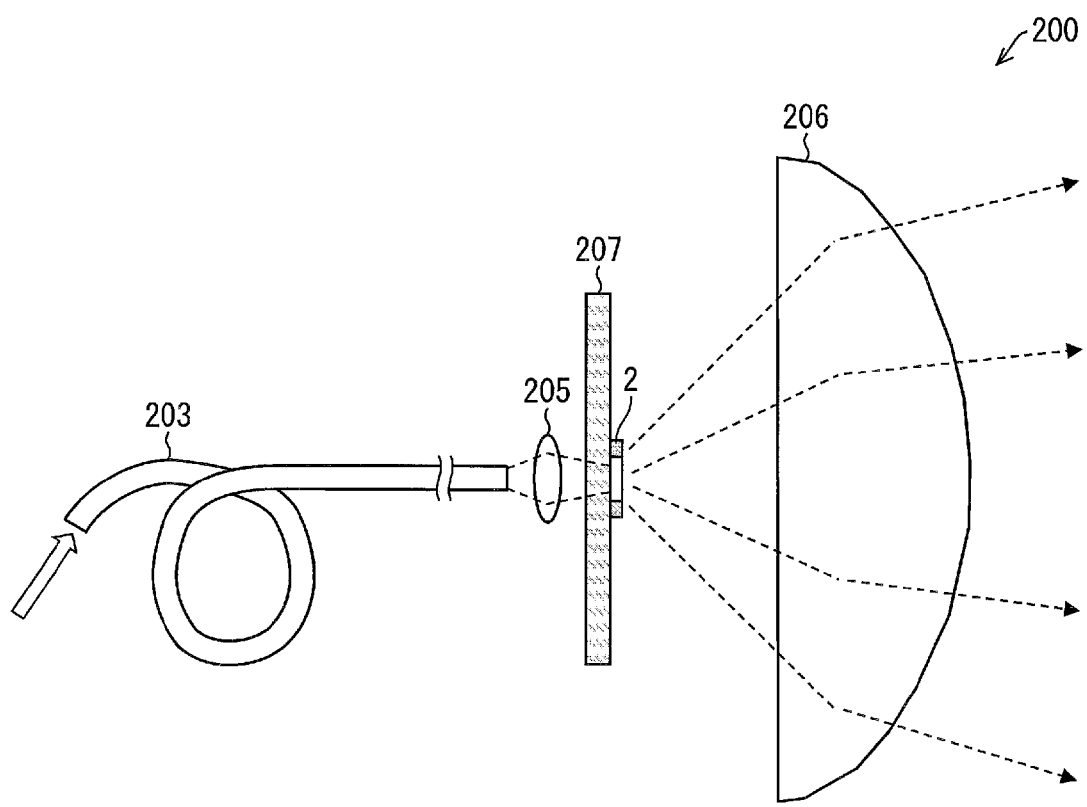
FIG. 3 is a schematic view illustrating a structure of an illumination apparatus according to Embodiment 2 of the present disclosure.

FIG. 3 is a schematic view illustrating a structure of an illumination apparatus (light source device) 200 according to this embodiment. The illumination apparatus 200 includes a fluorescence emitting section (light emitting section) 2, an optical fiber 203, a convex lens 205, a transmitting lens (optical transmission system) 206, and a transparent substrate 207.

The illumination apparatus 200 is configured to transmit fluorescence emitted from the fluorescence emitting section 2 through the transmitting lens 206 in a predetermined direction. The illumination apparatus 200 is suitable for a vehicle headlight, a spotlight or the like.

The illumination apparatus 200 according to this embodiment includes the semiconductor lasers 101a to 101e and the convex lenses 102a to 102e, similarly to the illumination apparatus 100 according to Embodiment 1. However, the semiconductor lasers 101a to 101e and the convex lenses 102a to 102e are not illustrated in FIG. 3.

Excitation light emitted from the semiconductor lasers 101a to 101e (not illustrated) is incident on an incident end of the optical fiber 203 through the convex lenses 102a to 102e (not illustrated) in the illumination apparatus 200.

The optical fiber 203 in this embodiment is bundled up on an emitting end side of the five optical fibers for taking in the excitation light concentrated by the convex lenses 102a to 102e, similarly to the optical fiber 103 according to Embodiment 1. Only the vicinity of an emitting end of the optical fiber 203 is illustrated in FIG. 3.

The excitation light concentrated by the convex lenses 102a to 102e is emitted from the emitting end of the optical fiber 203 to the convex lens 205. The convex lens 205 concentrates the excitation light.

The transparent substrate 207 is provided to support the fluorescence emitting section 2. As a material of the transparent substrate 207, glass, sapphire or the like may be used. The excitation light concentrated by the convex lens 205 is incident on the fluorescence emitting section 2 after passing through the transparent substrate 207.

Phosphor particles included in the fluorescence emitting section 2 are excited by the excitation light, and thus fluorescence is emitted from the fluorescence emitting section 2. The structure of the fluorescence emitting section 2 will be described below in detail.

The transmitting lens 206 is a convex lens which transmits fluorescence emitted from the fluorescence emitting section 2. The fluorescence transmitted by the transmitting lens 206 are emitted to the outside of the illumination apparatus 200. In other words, the transmitting lens 206 is an optical transmission system which transmits the fluorescence emitted from the fluorescence emitting section 2 in a desired direction.

In the illumination apparatus 200, a configuration is illustrated in which the transmitting lens 206 which is a convex lens is used as the optical transmission system. However, the optical transmission system may be configured in other configurations such as a projector type of optical transmission system which employs a reflector and a convex lens, or a configuration of an optical transmission system with only a reflector (concave mirror).

Figure 4A:
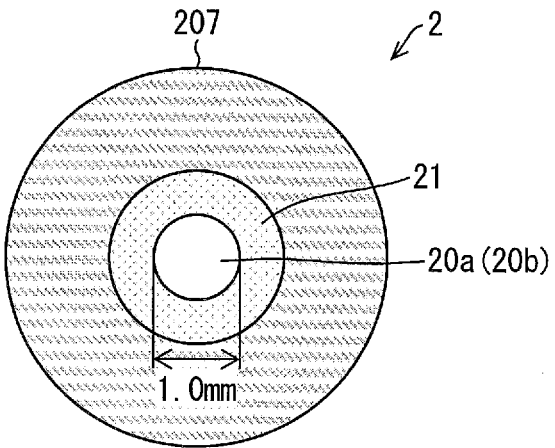
FIG. 4A is a top view of a fluorescence emitting section according to Embodiment 2 of the present disclosure.
Figure 4B:
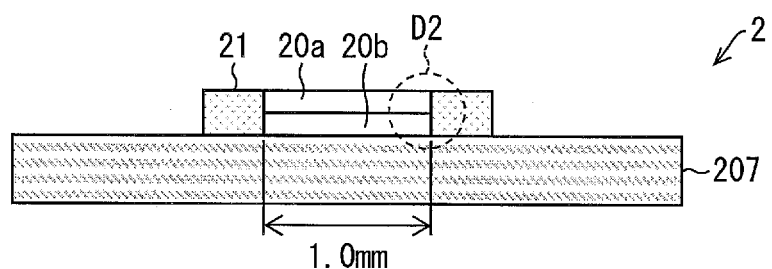
FIG. 4B is a cross-sectional side view of the fluorescence emitting section.
Figure 4C:
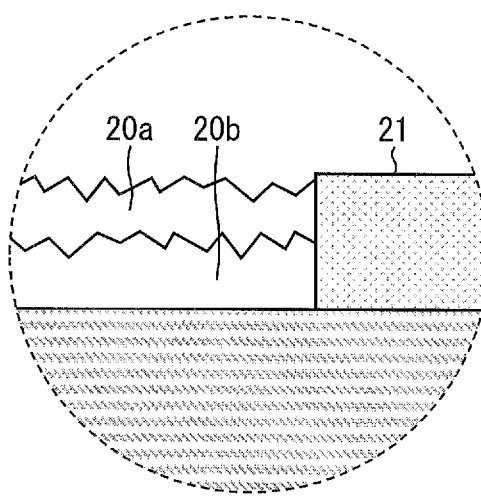
FIG. 4C is an enlarged view of a part of the cross-sectional side view illustrated in FIG. 4B.

FIGS. 4A to 4C are diagrams showing a structure of the fluorescence emitting section 2. FIG. 4A is a top view of the fluorescence emitting section 2, FIG. 4B is a cross-sectional side view of the fluorescence emitting section 2, and FIG. 4C is an enlarged view of a part (D2) of the cross-sectional side view illustrated in FIG. 4B.

The fluorescence emitting section 2 includes two phosphor layers of a phosphor layer (first layer) 20a and a phosphor layer (second layer) 20b, as illustrated in FIG. 4B. The phosphor layers 20a and 20b are stacked in order from the upper side of the fluorescence emitting section 2.

The upper side means a side of a surface from which illumination light having fluorescence is mostly emitted in the fluorescence emitting section 2. The phosphor layer 20a on the top side is also referred to as the top phosphor layer. The transmitting lens 206 is provided as the optical transmission system, which faces the top phosphor layer 20a of the fluorescence emitting section 2 in the illumination apparatus 200.

The phosphor layer 20a which is the top layer (first layer) includes a blue light emitting phosphor particle (first phosphor particle) (BAM phosphor) and a scatterer particle formed of $TiO_2$. The phosphor layer 20a has an average layer thickness of 30 μm. BAM phosphor emits blue fluorescence with a peak wavelength (first peak wavelength) of about 455 nm.

The phosphor layer 20b which is a lower layer (second layer) includes a yellow light emitting phosphor particle (second phosphor particle) (α-SiAlON phosphor). The phosphor layer 20b has an average layer thickness of 20 μm. α-SiAlON phosphor emits yellow fluorescence with a peak wavelength (second peak wavelength) of about 586 nm.

As described above, the phosphor layers 20a and 20b respectively include single phosphor particles.

TiO$_2$ is illustrated as scatterer particles included in the phosphor layer 20a in this embodiment, but the scatterer particles are not limited to TiO$_2$. For example, fumed silica, Al$_2$O$_3$, zirconium oxide, diamond or the like may be used as the scatterer particles.

In the phosphor layers 20a and 20b, the phosphor particles with each other, the scatterer particles with each other, the phosphor particle with the scatterer particle, the phosphor particle with a base material, or the scatterer particle with a base material are bound by using a binding agent which is primarily formed of SiO$_2$ (silicon dioxide) or TiO$_2$.

The phosphor layers 20a and 20b are manufactured not to include organic substances in order to reduce property degradation due to irradiation with the excitation light.

The respective phosphor layers 20a and 20b have an average layer thickness larger than the diameter of the phosphor particles included therein. The phosphor layers 20a and 20b are configured such that it is difficult to see the lower phosphor layer from the upper phosphor layer. For example, as illustrated in FIG. 4A, only the phosphor layer 20a is seen, and the phosphor layers 20b are not seen when the phosphor layer 20a is viewed from the upper side.

In other words, the top phosphor layer 20a completely covers the lower phosphor layer 20b. Accordingly, the phosphor particles included in the phosphor layer 20b are not seen through a gap between the phosphor particles included in the phosphor layer 20a. Here, the phosphor particles are arranged in the phosphor layers 20a and 20b such that it is difficult to see the lower phosphor layer 20b from the top phosphor layer 20a.

As illustrated in FIG. 4A, the upper surface of the phosphor layers 20a and 20b is formed in a circular shape with a diameter of 1.0 mm.

As illustrated in FIG. 4B, side surfaces (circumference) of the phosphor layers 20a and 20b are covered by a reflective member (shielding member) 21. FIG. 4C is an enlarged view of a region D2 in the vicinity of an interface between (i) the phosphor layers 20a and 20b and (ii) the reflective member 21 in FIG. 4B.

The reflective member 21 is a member formed of aluminum. The phosphor layers 20a and 20b and the reflective member 21 are formed on the surface of the transparent substrate 207.

Furthermore, as illustrated in FIG. 4C, an uneven structure with a surface roughness of Ra=1 μm, approximately, is provided on the upper surface of the phosphor layer 20a. An uneven structure with Ra=1 μm, approximately, is provided on an interface between the phosphor layer 20a and the phosphor layer 20b. The upper surface of the phosphor layer 20a means a surface constituting an upper surface of the fluorescence emitting section 2.

The phosphor layer 20b is irradiated with the excitation light emitted from the semiconductor lasers 101a to 101e, and thus the phosphor particles are excited which are respectively included in the phosphor layer 20a and the phosphor layer 20b.

Accordingly, in the process of being emitted from the upper surface of the fluorescence emitting section 2 and reaching the eyes of an observer, (i) blue fluorescence emitted from the phosphor layer 20a, and (ii) yellow fluorescence emitted from the phosphor layer 20b are mixed to obtain uniform white light. The white light is used as illumination light emitted from the illumination apparatus 200.

In the fluorescence emitting section 2, the blue light emitting phosphor particle included in the phosphor layer 20a does not absorb yellow fluorescence emitted from the phosphor layer 20b and allows the yellow fluorescence to pass through the blue light emitting phosphor particles.

Accordingly, the phosphor layers 20a and 20b are stacked in order from the upper side, and thus the yellow fluorescence emitted from the phosphor layer 20b is not absorbed in the phosphor layer 20a provided in the upper portion of the fluorescence emitting section 2, and emitted to the outside of the fluorescence emitting section 2. It is possible to uniformly and economically take the white light out from the upper surface of the fluorescence emitting section 2.

According to the illumination apparatus 200 of this embodiment, it is possible to uniformly and economically take the white light out as illumination light having suppressed variation from the upper surface of the fluorescence emitting section 2 including a plurality of the phosphor layer 20a and the phosphor layer 20b, similarly to the illumination apparatus 100 of Embodiment 1.

In the fluorescence emitting section 2, the uneven structure is provided on the upper surface of the phosphor layer 20a, and thus fluorescence with a corresponding color among plural types of colors is diffused from the phosphor layer 20a in directions which are different according to the wavelengths thereof. The fluorescence is emitted to the outside of the fluorescence emitting section 2. Thus, when the fluorescence emitting section 2 is viewed from the upper portion thereof, white light is observed which is obtained by further uniformly mixing the fluorescence with plural types of colors.

In the fluorescence emitting section 2, the uneven structure is also provided on the interface between the phosphor layer 20a and the phosphor layer 20b. The uneven structure is present on the interface between the phosphor layer 20a and the phosphor layer 20b, and thus the fluorescence is scattered in the interface between the phosphor layer 20a and the phosphor layer 20b when the fluorescence reaches the phosphor layer 20a, which is emitted from the phosphor layer 20b.

Accordingly, it is possible to allow the fluorescence emitted from the phosphor layer 20b to be incident on the phosphor layer 20a regardless of the arrangement of the phosphor particles included in the phosphor layer 20b. The effect is achieved in which the fluorescence incident from the phosphor layer 20b is further uniformly distributed in the phosphor layer 20a.

The uneven structure may have a surface roughness of Ra=1 μm, approximately, or more which is provided on the upper surface of the phosphor layer 20a, and the interface between the phosphor layer 20a and the phosphor layer 20b. This is because it is difficult to allow the uneven structure to sufficiently scatter the illumination light when the size of the uneven structure is smaller than that of the wavelength of the fluorescence included in the illumination light emitted from the fluorescence emitting section 2.

The wavelength range of the illumination light is the wavelength range of the visible light, and a range of approximately 360 nm to 830 nm (based on JISZ8120) is assumed. A value which satisfies Ra=1 μm, approximately, or more is used as the size of the uneven structure which is larger than the wavelength range of the visible light.

Furthermore, the scatterer particles are included in the phosphor layer 20a in addition to the phosphor particles. The scatterer particles are present in the phosphor layer 20a, and thus scattering of fluorescence is further facilitated which is generated in the phosphor layer 20a and the phosphor layer 20b. Accordingly, the effect is achieved by which it is possible to facilitate the mixing of fluorescence having plural types of colors.

In the phosphor layer 20a, the scatterer particles may be smaller than the phosphor particles in diameter. For example, the median diameter of the phosphor particles is satisfied by d50=10 μm, and the median diameter of the scatterer particles is satisfied by d50=1 μm in the phosphor layer 20a of this embodiment.

In this case, the scatterer particles with a diameter of 1 μm may be buried in a gap occurring when phosphor particles with a diameter of 10 μm are disposed in line in the phosphor layer 20a.

Therefore, it is possible to thinly form the fluorescence emitting section 2 since the fluorescence emitting section 2 is configured such that the top phosphor layer 20a completely covers the lower phosphor layer 20b. Accordingly, the effect is achieved by which it is possible to improve heat-radiating properties of the fluorescence emitting section 2.

In the fluorescence emitting section 2, the side surfaces of the phosphor layer 20a and the phosphor layer 20b are covered by the reflective member 21.

The effect is also achieved in the fluorescence emitting section 2: the occurrence of the fluorescence with different colors being separately emitted from the side surfaces of the respective phosphor layers 20a and 20b in an end portion of the fluorescence emitting section 2 is reduced; the light-emitting form of the fluorescence emitting section 2 is a desired form; and the luminous efficiency thereof is improved.

A surface on which the excitation light is mostly incident faces a surface from which fluorescence is mostly emitted to the outside (that is, the upper surface of the top phosphor layer 20a) in the fluorescence emitting section 2 according to this embodiment. This structure of the fluorescence emitting section is referred to as a transmission type light emitting section.

The phosphor layer in which phosphor particles with a short light-emitting wavelength are included may be stacked as the phosphor layer having a surface from which fluorescence is emitted outwardly, the light-emitting wavelength becoming shorter in order from the phosphor layer (that is, in order directed from the top phosphor layer to the lower phosphor layer). In other words, the first peak wavelength of fluorescence emitted from the top phosphor layer 20a may be shorter than the second peak wavelength of fluorescence emitted from the lower phosphor layer 20b.

In this case, the effect is achieved by which it is possible to suppress loss in association with self-absorption of the fluorescence in the respective phosphor layers. The effect achieved with this configuration is achieved in both a case where the fluorescence emitting section is a reflection type light emitting section (case of the fluorescence emitting section 1 according to the Embodiment 1), and a case where the fluorescence emitting section is a transmission type light emitting section (case of the fluorescence emitting section 2 according to the Embodiment 2).

Still another embodiment of the present disclosure will be described as follows with reference to FIGS. 5 to 6C. For a convenient description, members are denoted by the same reference numerals, which have the same function as the described members in the above embodiments, and description thereof will be omitted.

Figure 5:
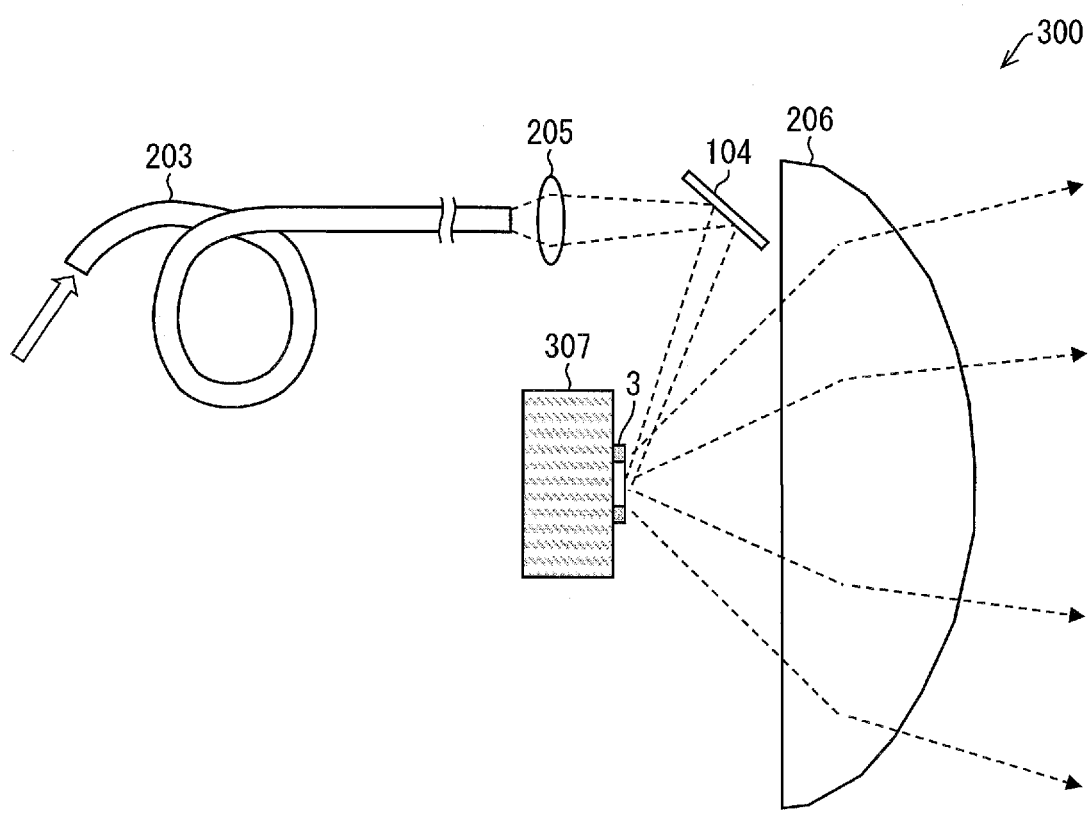
FIG. 5 is a schematic view illustrating a structure of an illumination apparatus according to Embodiment 3 of the present disclosure.

FIG. 5 is a schematic view illustrating a structure of an illumination apparatus (light source device) 300 according to this embodiment. The illumination apparatus 300 includes a fluorescence emitting section (light emitting section) 3, the optical fiber 203, the convex lens 205, the transmitting lens 206 and a metal base 307.

The illumination apparatus 300 is configured to transmit fluorescence emitted from the fluorescence emitting section 3 through the transmitting lens 206 in a predetermined direction. The illumination apparatus 300 is suitable for a vehicle headlight, a spotlight or the like.

The illumination apparatus 300 according to this embodiment includes the semiconductor lasers 101a to 101e and the convex lenses 102a to 102e, similarly to the illumination apparatus 200 according to Embodiment 2. However, the semiconductor lasers 101a to 101e and the convex lenses 102a to 102e are also not illustrated in FIG. 5, similarly to FIG. 3.

The excitation light concentrated by the convex lens 205 is emitted to the reflecting mirror 104. The excitation light reflected by the reflecting mirror 104 is incident on the fluorescence emitting section 3.

The excitation light excites phosphor particles included in the fluorescence emitting section 3, and thus fluorescence is emitted from the fluorescence emitting section 3. A structure of the fluorescence emitting section 3 will be described below in detail.

The metal base 307 is provided to support the fluorescence emitting section 3. For example, Al may be used as a material of the metal base 307. The metal base 307 may be formed by coating a substrate with silver or aluminum, the substrate being formed of any material such as copper, stainless steel, and magnesium.

Fluorescence emitted from the fluorescence emitting section 3 is transmitted by the transmitting lens 206 provided as an optical transmission system, similarly to the illumination apparatus 200 according to Embodiment 2. The fluorescence transmitted by the transmitting lens 206 is emitted to the outside of the illumination apparatus 300.

The optical transmission system may be also configured in other configurations such as a projector type optical transmission system which employs a reflector and a convex lens, and a configuration of an optical transmission system with only a reflector (concave mirror) in the illumination apparatus 300, similarly to the illumination apparatus 200 according to Embodiment 2.

Figure 6A:
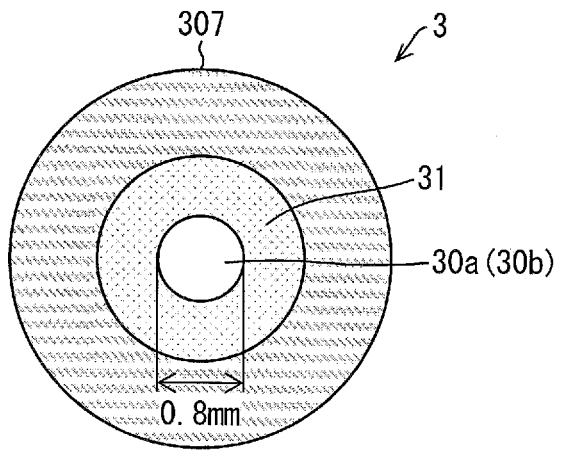
FIG. 6A is a top view of a fluorescence emitting section according to Embodiment 3 of the present disclosure.
Figure 6B:
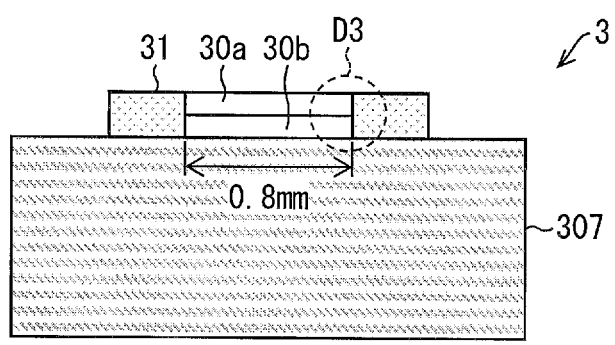
FIG. 6B is a cross-sectional side view of the fluorescence emitting section.
Figure 6C:
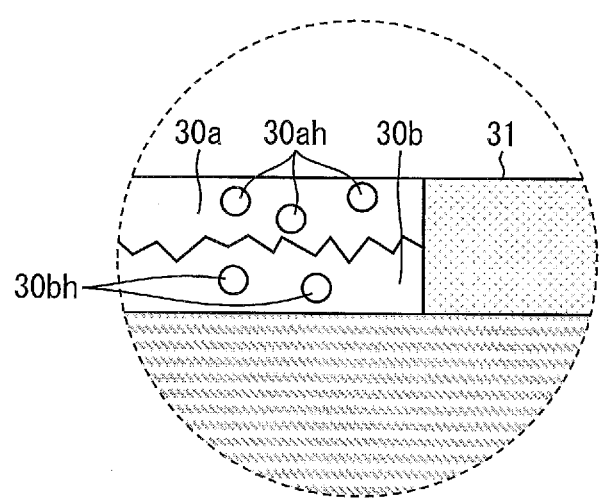
FIG. 6C is an enlarged view of a part of the cross-sectional side view illustrated in FIG. 6B.

FIGS. 6A to 6C are diagrams showing a structure of the fluorescence emitting section 3. FIG. 6A is a top view of the fluorescence emitting section 3. FIG. 6B is a cross-sectional side view of the fluorescence emitting section 3. FIG. 6C is an enlarged view of a part (D3) of the cross-sectional side view illustrated in FIG. 6B.

The fluorescence emitting section 3 includes two phosphor layers of a phosphor layer (first layer) 30a and a phosphor layer (second layer) 30b, as illustrated in FIG. 6B. The phosphor layers 30a and 30b are stacked in order from the upper side of the fluorescence emitting section 3.

Here, the upper side means a side of a surface from which the illumination light including the fluorescence is mostly emitted in the fluorescence emitting section 3. The phosphor layer 30a on the top side is also referred to as the top phosphor layer. The transmitting lens 206 is provided as the optical transmission system, which faces the top phosphor layer 30a of the fluorescence emitting section 3 in the illumination apparatus 300.

The phosphor layer 30a which is the top layer (first layer) includes a blue light emitting phosphor particle (first phosphor particle) (BAM phosphor). The phosphor layer 30a has an average layer thickness of 30 μm. BAM phosphor emits blue fluorescence with a peak wavelength (first peak wavelength) of about 455 nm.

The phosphor layer 30b which is a lower layer (second layer) includes a red light emitting phosphor particle (second phosphor particle) (CASN phosphor) and a green light emitting phosphor particle (second phosphor particle) (β-SiAlON phosphor). The phosphor layer 30b has an average layer thickness of 20 μm.

Red fluorescence emitted from CASN phosphor and green fluorescence emitted from β-SiAlON phosphor are generated in the phosphor layer 30b.

As described above, single phosphor particles are included in the top phosphor layer 30a.

Phosphor particles or the phosphor particle and a base material are sealed with glass in each of the phosphor layer 30a and the phosphor layer 30b.

The phosphor layers 30a and 30b are manufactured not to include organic substances in order to reduce property degradation due to irradiation with the excitation light.

The respective phosphor layers 30a and 30b have an average layer thickness larger than the diameter of the phosphor particles included therein. The phosphor layers 30a and 30b are configured such that it is difficult to see the lower phosphor layer from the upper phosphor layer.

For example, as illustrated in FIG. 6A, only the phosphor layer 30a is seen, and the phosphor layer 30b is not seen when the phosphor layer 30a is viewed from the upper side. Here, the phosphor particles are arranged in the phosphor layers 30a and 30b such that it is difficult to see the lower phosphor layer 30b from the top phosphor layer 30a.

As illustrated in FIG. 6A, the upper surface of the phosphor layers 30a and 30b is formed in a circular shape with a diameter of 0.8 mm.

As illustrated in FIG. 6B, side surfaces (circumference) of the phosphor layers 30a and 30b are covered by an absorptive member (shielding member) 31. FIG. 6C is an enlarged view of a region D3 in the vicinity of an interface between (i) the phosphor layers 30a and 30b and (ii) the absorptive member 31 in FIG. 6B.

The absorptive member 31 is a member formed of carbon. The phosphor layers 30a and 30b and the absorptive member 31 are formed on the surface of the metal base 307.

Furthermore, as illustrated in FIG. 6C, an uneven structure with Ra=1 μm, approximately, is provided on the interface between the phosphor layer 30a and the phosphor layer 30b.

Gaps are respectively provided between the phosphor particles in the phosphor layer 30a and the phosphor layer 30b. As illustrated in FIG. 6C, the gaps 30ah are present in the phosphor layer 30a. The gaps 30bh are present in the phosphor layer 30b.

The glass is buried in the gaps between the phosphor particles or between the phosphor particle and the base material in each of the phosphor layer 30a and the phosphor layer 30b.

However, the phosphor layer 30a and the phosphor layer 30b are formed in such a manner that the glass is not completely buried in the gaps between the phosphor particles, and thus the gaps 30ah and the gaps 30bh may be provided.

In this embodiment, a mixture of the phosphor particles and glass frit (glass powder) is heated at the melting point of the glass or higher to obtain the phosphor layer 30a and the phosphor layer 30b, but the gaps 30ah and 30bh may be made by controlling the mixture ratio of the phosphor particles and the glass frit and mixing the glass frit in a small amount such that a gap between the phosphor particles is not filled.

The phosphor layer 30a is irradiated with the excitation light emitted from the semiconductor lasers 101a to 101e, and thus the phosphor particles are excited which are respectively included in the phosphor layer 30a and the phosphor layer 30b.

As described above, the phosphor layer 30b including red light emitting phosphor particles and green light emitting phosphor particles is excited by the excitation light, and thus emits fluorescence which has a color obtained by mixing red and green.

Accordingly, (i) blue fluorescence emitted from the phosphor layer 30a, and (ii) fluorescence with a color obtained by mixing red and green being emitted from the phosphor layer 30b are mixed to obtain uniform white light in the process of being emitted from the upper surface of the fluorescence emitting section 3 and reaching the eyes of an observer. The white light is used as illumination light emitted from the illumination apparatus 300.

In the fluorescence emitting section 3, a blue light emitting phosphor particle included in the phosphor layer 30a does not absorb yellow fluorescence emitted from the phosphor layer 30b and allows the yellow fluorescence to pass through the blue light emitting phosphor particles.

Accordingly, the phosphor layers 30a and 30b are stacked in order from the upper side, and thus the yellow fluorescence emitted from the phosphor layer 30b is not absorbed in the phosphor layer 30a provided in the upper portion of the fluorescence emitting section 3, but emitted to the outside of the fluorescence emitting section 3. It is possible to uniformly and economically take the white light out from the upper surface of the fluorescence emitting section 3.

According to the illumination apparatus 300 of this embodiment, it is possible to uniformly and economically take the white light out as illumination light having suppressed variation from the upper surface of the fluorescence emitting section 3 including a plurality of the phosphor layers 30a and 30b similarly to the illumination apparatus 100 of Embodiment 1.

The occurrence of the fluorescence with different colors being separately emitted from the side surfaces of the respective phosphor layers 30a and 30b in an end portion of the fluorescence emitting section 3 is reduced.

In the fluorescence emitting section 3, the gaps 30ah and 30bh are provided in the phosphor layers 30a and 30b.

The gaps 30ah are present in the phosphor layer 30a, and thus a large difference in refraction index occurs in an interface between the gaps 30ah and the phosphor particles included in the phosphor layer 30a. Scattering or refracting of fluorescence emitted from the phosphor layer 30a occurs due to the difference in refraction index in the interface between the gaps 30ah and the phosphor particles.

Similarly, the gaps 30bh are present in the phosphor layer 30b, and thus scattering or refracting of fluorescence occurs in an interface between the gaps 30bh and the phosphor particles included in the phosphor layer 30b.

Accordingly, the gaps 30ah and 30bh are provided, and thus the effect is achieved in which the mixing of fluorescence is facilitated in the fluorescence emitting section 3.

In this embodiment, the gaps 30ah and 30bh are respectively provided in the phosphor layer 30a and the phosphor layer 30b, but the gaps may be provided in only one of the phosphor layer 30a and the phosphor layer 30b.

When taking fluorescence outward from the fluorescence emitting section 3, the fluorescence with each color may be mixed. In order to do this, the gaps may be provided in the top phosphor layer (that is, the phosphor layer 30a).

Still another embodiment of the present disclosure will be described as follows with reference to FIGS. 7 to 8C. For a convenient description, members are denoted by the same reference numerals, and have the same function as the described members in the above embodiments, and description thereof will be omitted.

Figure 7:
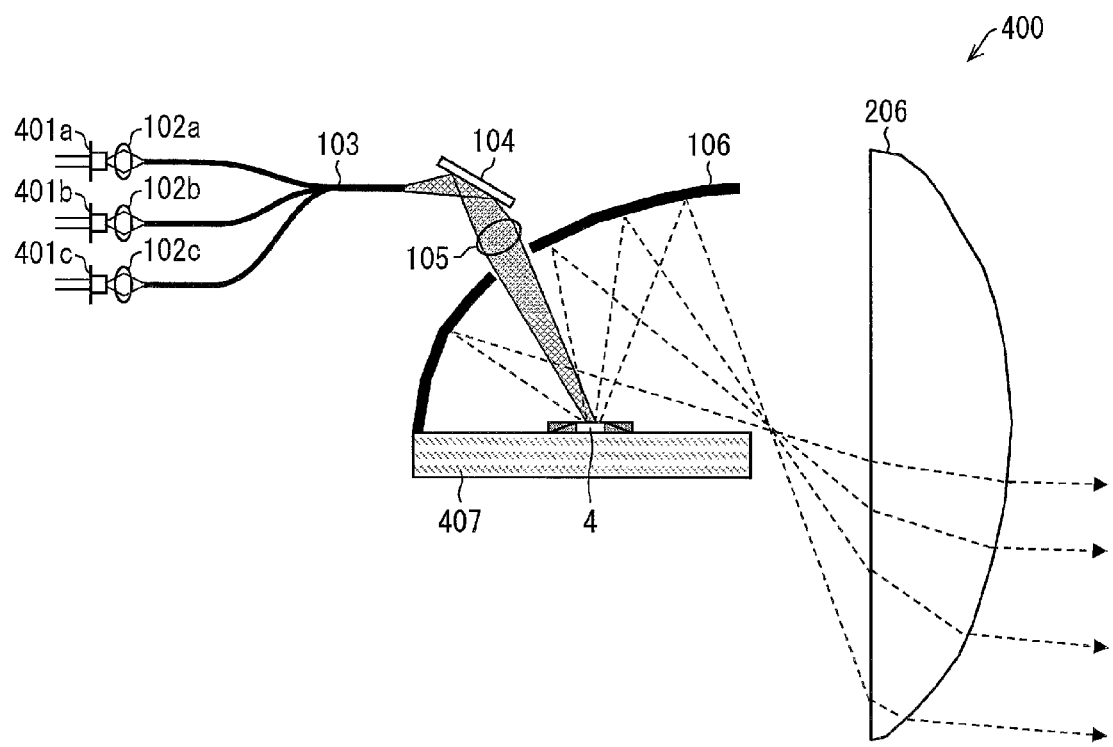
FIG. 7 is a schematic view illustrating a structure of an illumination apparatus according to Embodiment 4 of the present disclosure.

FIG. 7 is a schematic view illustrating a structure of an illumination apparatus (light source device) 400 according to this embodiment. The illumination apparatus 400 includes a fluorescence emitting section (light emitting section) 4, semiconductor lasers (excitation light source) 401a to 401c, the convex lenses 102a to 102c, the optical fiber 103, the reflecting mirror 104, the convex lens 105, the reflector 106, the transmitting lens 206 and a ceramic base 407.

The illumination apparatus 400 is configured to transmit fluorescence emitted from the fluorescence emitting section 4 through the reflector 106 and the transmitting lens 206 in a predetermined direction. The illumination apparatus 400 is suitable for a vehicle headlight, a spotlight or the like.

The semiconductor lasers 401a to 401c are three excitation light sources which emit excitation light for exciting phosphor particles included in the fluorescence emitting section 4. Each of the semiconductor lasers 401a to 401c emits laser light having a wavelength of 450 nm and an output of 1 W as excitation light.

As in FIG. 1, a heat radiating mechanism provided in the semiconductor lasers 401a to 401c and a power supply system connected with the semiconductor lasers 401a to 401c are not illustrated in FIG. 7.

Each of the semiconductor lasers 401a to 401c is a semiconductor light emitting element which laser-oscillates at a wavelength of 450 nm. Light with a wavelength of 450 nm is visible light, and is observed as blue light.

Accordingly, the semiconductor lasers 401a to 401c are different from the semiconductor lasers 101a to 101e in Embodiment 1 to Embodiment 3 in that the semiconductor lasers 401a to 401c emit visible light as excitation light. In the illumination apparatus 400 according to this embodiment, blue excitation light emitted from the semiconductor lasers 401a to 401c is used as one component of white illumination light including the fluorescence.

The wavelength of the excitation light emitted from the semiconductor lasers 401a to 401c may be appropriately selected according to the excitation wavelength of the phosphor particles included in the fluorescence emitting section 4. The number or the output of the semiconductor lasers 401a to 401c may be appropriately selected according to the specification of the illumination apparatus 400.

Three convex lenses 102a to 102c are provided as a convex lens for concentrating excitation light respectively emitted from the semiconductor lasers 401a to 401c in the illumination apparatus 400.

The convex lenses 102a to 102c are three convex lenses which are arbitrarily selected from the convex lenses 102a to 102e in Embodiment 1. Function of the convex lenses 102a to 102c in this embodiment is the same as that of the convex lenses 102a to 102e in Embodiment 1, and thus detailed description thereof will be omitted.

Configurations and functions of the optical fiber 103, the reflecting mirror 104, and the convex lens 105 are the same as those of the illumination apparatus 100 in Embodiment 1. Thus, description of these members will be omitted.

In the illumination apparatus 400, as in the illumination apparatus 100 in Embodiment 1, the excitation light concentrated by the convex lens 105 passes through the through hole provided in the reflector 106, and is incident on the fluorescence emitting section 4. A structure of the fluorescence emitting section 4 will be described below in detail.

In this manner, the fluorescence emitting section 4 is irradiated with the excitation light emitted from the semiconductor lasers 401a to 401c. The phosphor particles included in the fluorescence emitting section 4 are excited by the excitation light, and thus the fluorescence from the fluorescence emitting section 4 is emitted.

The ceramic base 407 is provided to support the fluorescence emitting section 4. The ceramic base 407 is a substrate with high thermal conductivity and is formed of aluminum nitride, for example. The ceramic base 407 supports the reflector 106 in addition to the fluorescence emitting section 4 in the illumination apparatus 400.

In the illumination apparatus 400, as in the illumination apparatus 100 in Embodiment 1, the optical transmission system may be configured by using only the reflector 106 other than the transmitting lens 206. As in the illumination apparatus 200 in Embodiment 2 and the illumination apparatus 300 in Embodiment 3, the optical transmission system may be configured by using only the transmitting lens 206 other than the reflector 106.

Figure 8A:
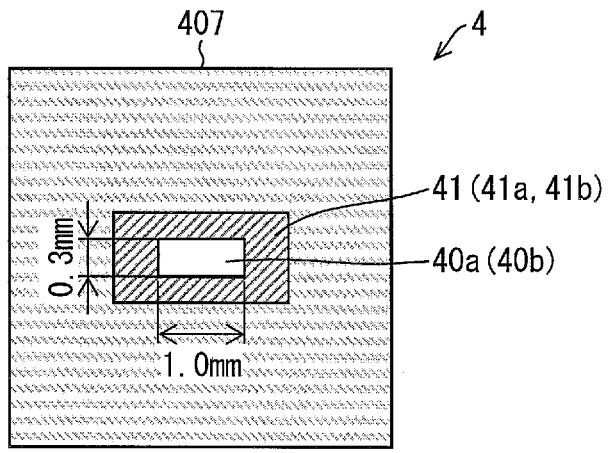
FIG. 8A is a top view of a fluorescence emitting section according to Embodiment 4 of the present disclosure.
Figure 8B:
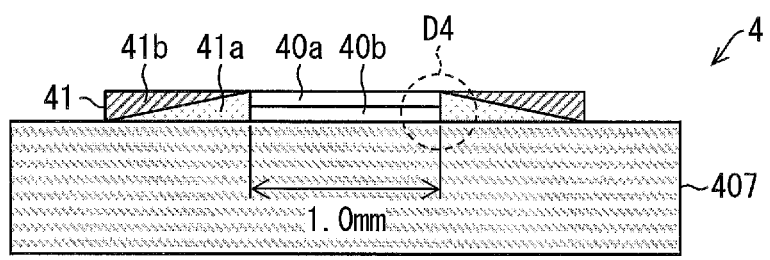
FIG. 8B is a cross-sectional side view of the fluorescence emitting section.
Figure 8C:
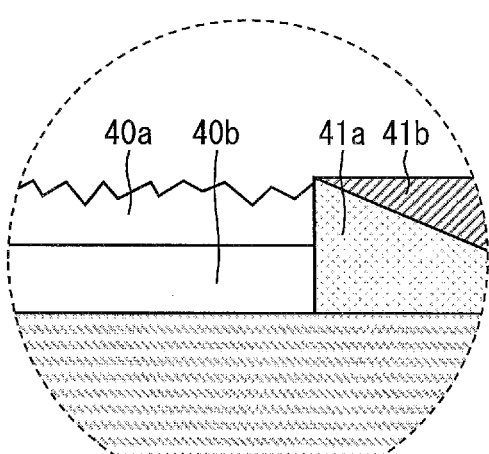
FIG. 8C is an enlarged view of a part of the cross-sectional side view illustrated in FIG. 8B.

FIGS. 8A to 8C are diagrams showing a structure of the fluorescence emitting section 4. FIG. 8A is a top view of the fluorescence emitting section 4. FIG. 8B is a cross-sectional side view of the fluorescence emitting section 4. FIG. 8C is an enlarged view of a part (D4) of the cross-sectional side view illustrated in FIG. 8B.

The fluorescence emitting section 4 includes two phosphor layers of a phosphor layer (first layer) 40a and a phosphor layer (second layer) 40b, as illustrated in FIG. 8B. The phosphor layers 40a and 40b are stacked in order from the upper side of the fluorescence emitting section 4.

Here, the upper side means a side of a surface from which the illumination light including fluorescence is mostly emitted in the fluorescence emitting section 4. The phosphor layer 40a on the top side is also referred to as the top phosphor layer. The reflector 106 is provided as the optical transmission system, which faces the top phosphor layer 40a of the fluorescence emitting section 4, and constitutes the optical transmission system of this embodiment, in the illumination apparatus 400.

The phosphor layer 40a which is the top layer (first layer) includes a yellow light emitting phosphor particle (first phosphor particle) (YAG: Ce phosphor). The phosphor layer 40a has an average layer thickness of 30 μm. YAG: Ce phosphor emits yellow fluorescence with a peak wavelength (first peak wavelength) of about 490 nm.

The phosphor layer 40b which is a lower layer (second layer) includes a red light emitting phosphor particle (second phosphor particle) (CASN phosphor). The phosphor layer 40b has an average layer thickness of 40 μm. CASN phosphor emits red fluorescence with a peak wavelength (second peak wavelength) of about 650 nm.

As described above, single phosphor particles are included in the phosphor layer 40a and 40b.

In the phosphor layers 40a and 40b, phosphor particles with each other or the phosphor particle with a base material are bound by using a binding agent which is formed of $SiO_2$ (silicon dioxide) or $TiO_2$.

The phosphor layers 40a and 40b are manufactured not to include organic substances in order to reduce property degradation due to irradiation with the excitation light.

The respective phosphor layers 40a and 40b have an average layer thickness larger than the diameter of the phosphor particles included therein. The phosphor layers 40a and 40b are configured such that it is difficult to see the lower phosphor layer from the upper phosphor layer.

For example, as illustrated in FIG. 8A, only the phosphor layer 40a is seen, and the phosphor layers 40b are not seen when the phosphor layer 40a is viewed from the upper side.

Here, the phosphor particles are arranged in the respective phosphor layers 40a and 40b such that it is difficult to see the lower phosphor layer 40b from the top phosphor layer 40a.

As illustrated in FIG. 8A, an upper surface of the phosphor layers 40a and 40b has a rectangular shape of 0.3 mm×1.0 mm. As illustrated in FIG. 8B, side surfaces (circumference) of the phosphor layers 40a and 40b are covered by a shielding member 41.

As illustrated in FIG. 8B, the shielding member 41 is formed with a reflective member (shielding member) 41a and an absorptive member (shielding member) 41b.

The reflective member 41a has an inclined surface. Accordingly, the reflective member 41a decreases in height as the reflective member 41a is farther separated from the phosphor layers 40a and 40b. The absorptive member 41b is provided on the inclined surface of the reflective member 41a. Accordingly, the absorptive member 41b decreases in height as the absorptive member 41b approaches the phosphor layers 40a and 40b.

The reflective member 41a is a member formed of aluminum. The absorptive member 41b is a member formed of carbon. The phosphor layers 40a and 40b and the shielding member 41 are formed on the surface of the ceramic base 407.

FIG. 8C is an enlarged view of a region D4 in the vicinity of an interface between (i) the phosphor layers 40a and 40b, and (ii) the reflective member 41a and the absorptive member 41b in FIG. 8B.

As illustrated in FIG. 8C, an uneven structure with Ra=1 μm, approximately, is provided on the upper surface of the phosphor layer 40a. The upper surface of the phosphor layer 40a means a surface constituting an upper surface of the fluorescence emitting section 4.

The side surfaces of the phosphor layers 40a and 40b come into direct contact with the reflective member 41a. On the other hand, the side surfaces of the phosphor layers 40a and 40b come into indirect contact with the absorptive member 41b through the reflective member 41a.

The phosphor layer 40a is irradiated with the excitation light emitted from the semiconductor lasers 401a to 401c, and thus the phosphor particles are excited which are respectively included in the phosphor layers 40a and 40b.

Accordingly, (i) yellow fluorescence emitted from the phosphor layer 40a, (ii) red fluorescence emitted from the phosphor layer 40b, and (iii) blue fluorescence which is diffuse-reflected or scattered on the upper surface of the phosphor layer 40a or in the phosphor layer 40a are mixed to obtain uniform white light in the process of being emitted from the upper surface of the fluorescence emitting section 4 and reaching the eyes of an observer.

The occurrence of fluorescence with different colors being separately emitted from the side surfaces of the phosphor layer 40a and 40b in an end portion of the fluorescence emitting section 4 is reduced. The white light is used as illumination light emitted from the illumination apparatus 400.

According to the illumination apparatus 400 of this embodiment, it is possible to uniformly and economically take the white light out as illumination light having suppressed variation from the upper surface of the fluorescence emitting section 4 including a plurality of the phosphor layers 40a and 40b, similarly to the illumination apparatus 100 of Embodiment 1.

The side surfaces of the phosphor layer 40a and the phosphor layer 40b are covered by the reflective member 41a in the fluorescence emitting section 4.

Thus, fluorescence directed to the side surfaces of the phosphor layers 40a and 40b is reflected by the reflective member 41a, and then returns to the inside of the phosphor layer 40a and the phosphor layer 40b. Accordingly, the light-emitting form of the fluorescence emitting section 4 is a desired form, and the luminous efficiency thereof is improved.

The absorptive member 41b is provided on the upper side of the reflective member 41a. When irradiation of the excitation light is performed outside of a region of phosphor layer 40a, the excitation light is absorbed in the upper surface of the absorptive member 41b which is provided on the upper side of the reflective member 41a.

Accordingly, it is possible to reduce excessive reflection of the excitation light and to further suppress variation of the illumination light on the upper surface of the fluorescence emitting section 4.

In the illumination apparatus 400 according to this embodiment, the white light is obtained as the illumination light including the excitation light in visible range which is diffuse-reflected or scattered on the upper surface of the phosphor layer 40a or in the phosphor layer 40a in addition to the fluorescence emitted from the fluorescence emitting section 4.

On the other hand, in the illumination apparatuses 100 to 300 according to Embodiment 1 to Embodiment 3, the white light is obtained as the illumination light, in which only the fluorescence emitted from the fluorescence emitting section is included as a component. The illumination apparatus 400 according to this embodiment is different from the illumination apparatuses 100 to 300 according to Embodiment 1 to Embodiment 3 in this respect.

In the illumination apparatus 400 according to this embodiment, the uneven structure is provided on the upper surface of the phosphor layer 40a. The uneven structure is present on the upper surface of the phosphor layer 40a, and thus it is possible to uniformly scatter and diffuse-reflect the excitation light on the upper surface of the fluorescence emitting section 4. The effect is achieved by which it is possible to appropriately suppress variation of the illumination light including the excitation light.

Still another embodiment of the present disclosure will be described as follows with reference to FIGS. 9 to 100. For convenient description, members are denoted by the same reference numerals, which have the same function as the described members in the above embodiments, and description thereof will be omitted.

Figure 9:
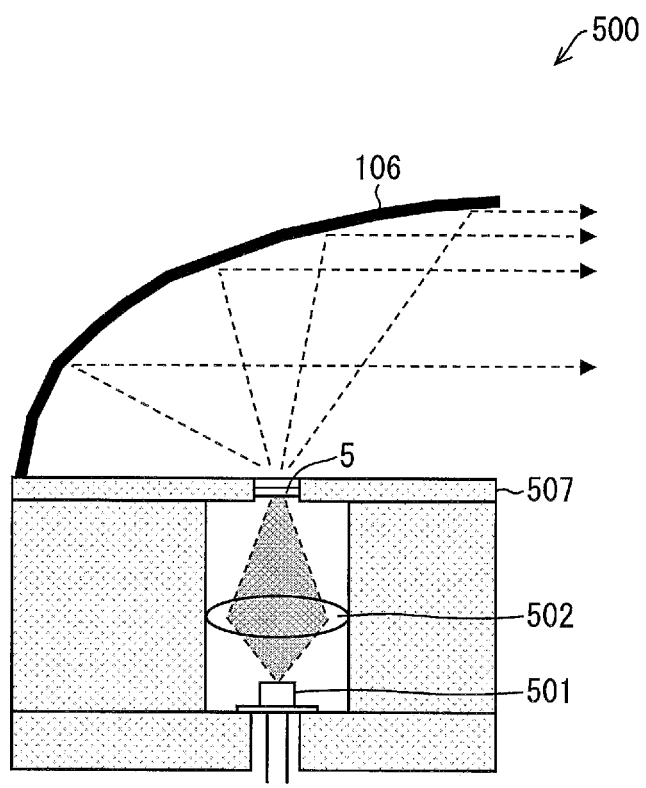
FIG. 9 is a schematic view illustrating a structure of an illumination apparatus according to Embodiment 5 of the present disclosure.

FIG. 9 is a schematic view illustrating a structure of an illumination apparatus (light source device) 500 according to this embodiment. The illumination apparatus 500 includes a fluorescence emitting section (light emitting section) 5, a semiconductor laser (excitation light source) 501, a convex lens 502, the reflector 106 and a metal base 507 (reflective member, shielding member).

The illumination apparatus 500 is configured to transmit fluorescence emitted from the fluorescence emitting section 5 through the reflector 106 in a predetermined direction. The illumination apparatus 500 is suitable for a vehicle headlight, a spotlight or the like.

The semiconductor laser 501 is one excitation light source which emits excitation light for exciting the phosphor particles included in the fluorescence emitting section 5. The semiconductor laser 501 emits laser light having a wavelength of 450 nm and an output of 2 W as excitation light. A power supply system connected with the semiconductor laser 501 is not illustrated in FIG. 9.

The semiconductor laser 501 is a semiconductor light emitting element which laser-oscillates at a wavelength of 450 nm. Accordingly, the semiconductor laser 501 is similar to the semiconductor lasers 401a to 401c of Embodiment 4 in that visible light (blue light) with a wavelength of 450 nm is emitted as the excitation light.

In the illumination apparatus 500 according to this embodiment, as in the illumination apparatus 400 according to Embodiment 4, blue excitation light emitted from the semiconductor laser 501 is used as one component of the white illumination light which includes the fluorescence.

The wavelength of the excitation light emitted from the semiconductor laser 501 may be appropriately selected according town excitation wavelength of the phosphor particles included in the fluorescence emitting section 5. The number or the output of the semiconductor laser 501 may be appropriately selected according to the specification of the illumination apparatus 500.

The convex lens 502 concentrates the excitation light emitted from the semiconductor laser 501. The excitation light concentrated by the convex lens 502 is incident on the fluorescence emitting section 5. The structure of the fluorescence emitting section 5 will be described below in detail.

In this manner, the fluorescence emitting section 5 is irradiated with the excitation light emitted from the semiconductor laser 501. The phosphor particles included in the fluorescence emitting section 5 are excited by the excitation light, and thus fluorescence from the fluorescence emitting section 5 is emitted.

The reflector 106 reflects the fluorescence emitted from the fluorescence emitting section 5 in a predetermined direction. The fluorescence reflected by the reflector 106 is emitted to the outside of the illumination apparatus 500.

The metal base 507 is provided to hold a side surface of the fluorescence emitting section 5. The metal base 507 is formed of aluminum or stainless steel. The metal base 507 holds the side surface of the fluorescence emitting section 5 and supports the reflector 106 in the illumination apparatus 500.

In the illumination apparatus 500 according to this embodiment, as in the illumination apparatus 200 in Embodiment 2 and the illumination apparatus 300 in Embodiment 3, the optical transmission system may also be configured by using the transmitting lens 206 other than the reflector 106. As in the illumination apparatus 400 in Embodiment 4, the optical transmission system may be configured by combining the reflector 106 and the transmitting lens 206.

Figure 10A:
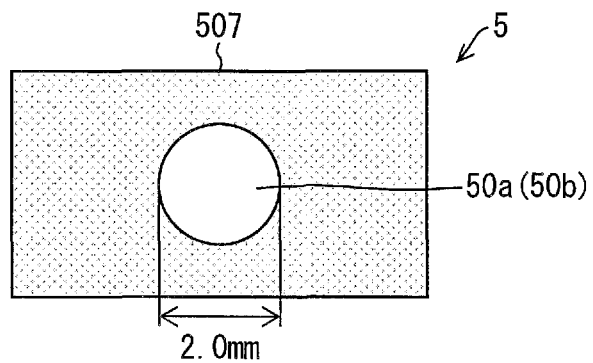
FIG. 10A is a top view of a fluorescence emitting section according to Embodiment 5 of the present disclosure.
Figure 10B:
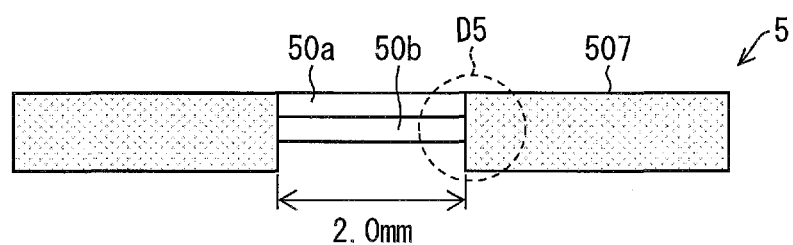
FIG. 10B is a cross-sectional side view of the fluorescence emitting section.
Figure 10C:
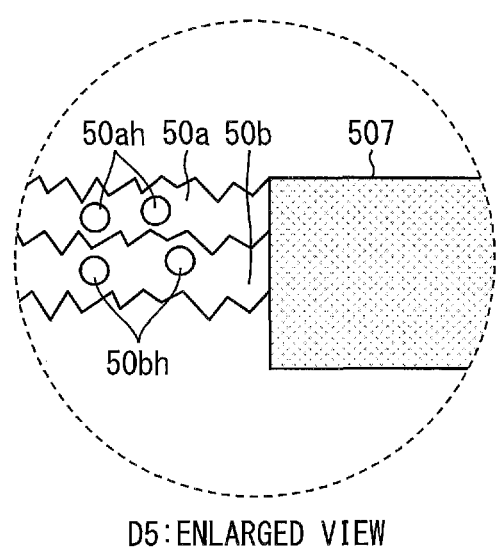
FIG. 10C is an enlarged view of a part of the cross-sectional side view illustrated in FIG. 10B.

FIGS. 10A to 10C are diagrams showing a structure of the fluorescence emitting section 5. FIG. 10A is a top view of the fluorescence emitting section 5. FIG. 10B is a cross-sectional side view of the fluorescence emitting section 5. FIG. 10C is an enlarged view of a part (D5) of the cross-sectional side view illustrated in FIG. 10B.

The fluorescence emitting section 5 includes two phosphor layers of a phosphor layer (first layer) 50a and a phosphor layer (second layer) 50b, as illustrated in FIG. 10B. The phosphor layers 50a and 50b are stacked in order from the upper side of the fluorescence emitting section 5.

Here, the upper side means a side of a surface from which the illumination light including fluorescence is mostly emitted in the fluorescence emitting section 5. The phosphor layer 50a on the top side is also referred to as the top phosphor layer. The reflector 106 is provided as the optical transmission system, which faces the top phosphor layer 50a of the fluorescence emitting section 5 in the illumination apparatus 500.

The phosphor layer 50a which is the top layer (first layer) includes a green light emitting phosphor particle (first phosphor particle) (β-SiAlON phosphor). The phosphor layer 50a has an average layer thickness of 20 μm. β-SiAlON phosphor emits green fluorescence with a peak wavelength (first peak wavelength) of about 540 nm.

The phosphor layer 50b which is a lower layer (second layer) includes a red light emitting phosphor particle (second phosphor particle) (CASN phosphor). The phosphor layer 50b has an average layer thickness of 40 μm. CASN phosphor emits red fluorescence with a peak wavelength (second peak wavelength) of about 650 nm.

The respective phosphor layers 50a and 50b are manufactured as a plate-shaped ceramic layer including phosphor particles with a diameter of about 10 μm or less.

The phosphor layers 50a and 50b are manufactured not to include organic substances in order to reduce property degradation due to irradiation with the excitation light.

The respective phosphor layers 50a and 50b have an average layer thickness larger than the diameter of the phosphor particles included therein. The phosphor layers 50a and 50b are configured such that it is difficult to see the lower phosphor layer from the upper phosphor layer.

For example, as illustrated in FIG. 10A, only the phosphor layer 50a is seen, but the phosphor layer 50b is not seen when the phosphor layer 50a is viewed from the upper side. Here, the phosphor particles are arranged in the phosphor layers 50a and 50b such that it is difficult to see the lower phosphor layer 50b from the top phosphor layer 50a.

As illustrated in FIG. 10A, the upper surface of the phosphor layers 50a and 50b is formed in a circular shape with a diameter of 2.0 mm.

As illustrated in FIG. 10B, side surfaces (circumference) of the phosphor layers 50a and 50b are held by the metal base 507. The metal base 507 in this embodiment functions as the reflective member (shielding member) illustrated in the above-described Embodiment 1 to Embodiment 4.

FIG. 10C is an enlarged view of a region D5 in the vicinity of an interface between (i) the phosphor layers 50a and 50b and (ii) the metal base 507 in FIG. 10B.

As illustrated in FIG. 10C, an uneven structure with Ra=1 μm, approximately, is provided on the upper surface of the phosphor layer 50a. An uneven structure with Ra=1 μm, approximately, is also provided on the lower surface of the phosphor layer 50b.

The upper surface of the phosphor layer 50a means a surface that constitutes the upper surface of the fluorescence emitting section 5. The lower surface of the phosphor layer 50b means a surface farthest from the upper surface of the fluorescence emitting section 5.

Furthermore, gaps are respectively provided between the phosphor particles in the phosphor layer 50a and the phosphor layer 50b. As illustrated in FIG. 10C, the gaps 50ah are present in the phosphor layer 50a. The gaps 50bh are present in the phosphor layer 50b.

In the phosphor layers 50 and 50b, the phosphor particles with each other or the phosphor particle with a base material are bound by a binding agent which is primarily formed of $SiO_2$ or $TiO_2$, for example.

However, the binding agent is applied such that the binding agent is not completely buried in the gaps between the phosphor particles, and such that the binding agent is present at only a portion where the phosphor particles come in contact with each other, or the phosphor particle and the base material come in contact with each other, and thus the gaps 50ah and the gaps 50bh may be provided. This can be realized by appropriately adjusting the mixture ratio of the phosphor particles which are a raw material and the binding agent.

An uneven structure with Ra=1 μm, approximately, is also provided on an interface between the phosphor layer 50a and the phosphor layer 50b.

As in the fluorescence emitting section 2 according to Embodiment 2, the uneven structure is present on an interface between the phosphor layer 50a and the phosphor layer 50b, and thus the effect is achieved by which the fluorescence incident from the phosphor layer 50b is further uniformly distributed in the phosphor layer 50a.

The phosphor layer 50b is irradiated with the excitation light emitted from the semiconductor laser 501, and thus the phosphor particles are excited which are included in the respective phosphor layers 50a and 50b.

Accordingly, (i) green fluorescence which is emitted from the phosphor layer 50a, (ii) red fluorescence which is emitted from the phosphor layer 50b, (iii) and blue fluorescence which is scattered in the phosphor layers 50a and 50b to transmit the phosphor layers 50a and 50b are mixed to obtain uniform white light in the process of being emitted from the upper surface of the fluorescence emitting section 5 and reaching the eyes of an observer. The white light is used as illumination light emitted from the illumination apparatus 500.

In the fluorescence emitting section 5, green light emitting phosphor particles included in the phosphor layers 50a do not absorb red fluorescence emitted from the phosphor layer 50b, and allow the red fluorescence to pass through the green light emitting phosphor particles.

Accordingly, the phosphor layers 50a and 50b are stacked in order from the upper side, and thus the red fluorescence emitted from the phosphor layer 50b is not absorbed in the phosphor layer 50a provided in the upper portion of the fluorescence emitting section 5, but emitted to the outside of the fluorescence emitting section 5. It is possible to uniformly and economically take the white light out from the upper surface of the fluorescence emitting section 5.

According to the illumination apparatus 500 of this embodiment, it is possible to uniformly and economically take the white light out as illumination light having suppressed variation from the upper surface of the fluorescence emitting section 5 including a plurality of the phosphor layers 50a and 50b, similarly to the illumination apparatus 100 of Embodiment 1.

In the fluorescence emitting section 5, (i) the phosphor layer 50a which emits green fluorescence, and (ii) the phosphor layer 50b which emits red fluorescence are stacked in order from the upper side of the fluorescence emitting section 5. In other words, the phosphor layers 50a and 50b are stacked in such a manner that the phosphor layer 50a is positioned at the upper side which emits fluorescence with a relatively short wavelength, and the phosphor layer 50b is positioned at the lower side which emits fluorescence with a relatively long wavelength.

Thus, the red fluorescence emitted from the lower phosphor layer 50b is not absorbed in the upper phosphor layer 50a, but emitted outwardly from the upper surface of the fluorescence emitting section 5.

Accordingly, on the upper surface of the fluorescence emitting section 5, (i) the green fluorescence emitted from the phosphor layer 50a, and (ii) the red fluorescence emitted from the phosphor layer 50b are evenly mixed. Furthermore, blue excitation light is scattered in the phosphor layers 50a and 50b, and transmitted to the phosphor layers 50a and 50b.

As a result, the blue excitation light is mixed with the above-described green fluorescence and red fluorescence in the process of being emitted from the upper surface of the fluorescence emitting section 5 and reaching the eyes of an observer.

The occurrence of the fluorescence with different colors being separately emitted from the side surfaces of the respective phosphor layers 50a and 50b in an end portion of the fluorescence emitting section 5 is reduced. Thus, uniform white light emitted from the upper surface of the fluorescence emitting section 5 is obtained.

As in the fluorescence emitting section 2 according to Embodiment 2, the fluorescence emitting section 5 according to this embodiment is a transmission type light emitting section. On the other hand, the fluorescence emitting section 1 of Embodiment 1, the fluorescence emitting section 3 of Embodiment 3, and the fluorescence emitting section 4 of Embodiment 4 are reflection type light emitting sections.

The fluorescence emitting section 5 according to this embodiment is a transmission type light emitting section, and the lower phosphor layer 50b may or may not be exposed from the upper phosphor layer 50a. Here, the phosphor particles may be contained at high density, and the gaps between the phosphor particles may be small in the upper phosphor layer 50a.

The fluorescence emitting section 5 may be configured as a reflection type light emitting section such that the fluorescence emitting section with further improved luminous efficiency and heat-radiating property is realized. In this case, the illumination apparatus 500 may be configured to be suitable as a reflection type light emitting section.

Still another embodiment of the present disclosure will be described as follows with reference to FIGS. 11 to 12C. For convenient description, members are denoted by the same reference numerals, which have the same function as the described members in the above embodiments, and description thereof will be omitted.

Figure 11:
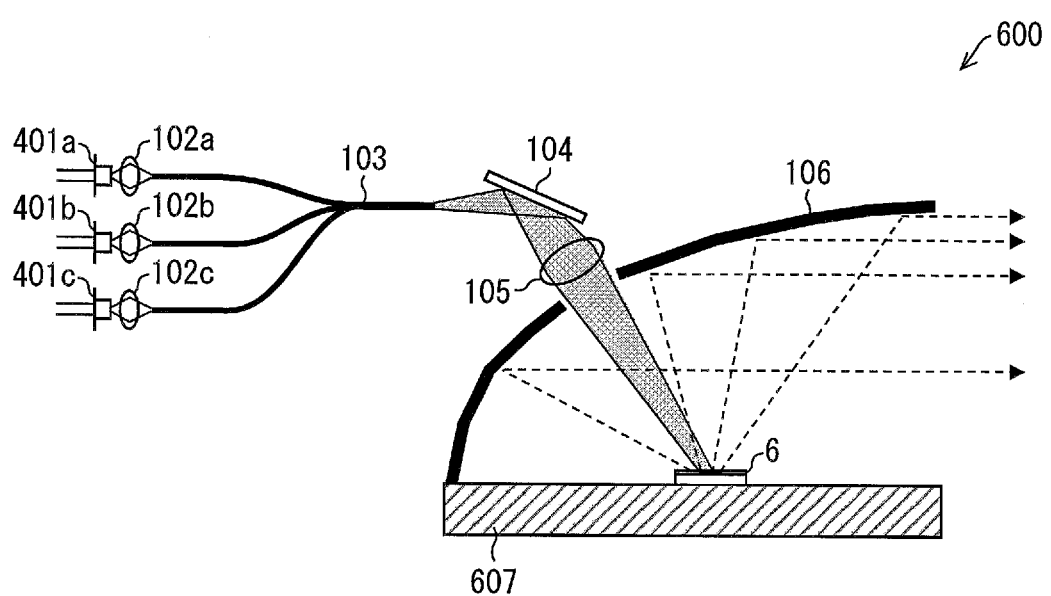
FIG. 11 is a schematic view illustrating a structure of an illumination apparatus according to Embodiment 6 of the present disclosure.

FIG. 11 is a schematic view illustrating a structure of an illumination apparatus (light source device) 600 according to this embodiment. The illumination apparatus 600 includes a fluorescence emitting section (light emitting section) 6, the semiconductor lasers 401a to 401c, and the convex lenses 402a to 402c, the optical fiber 103, the reflecting mirror 104, the convex lens 105, the reflector (optical transmission system) 106, and the metal base 107.

That is, the illumination apparatus 600 according to this embodiment is obtained by respectively substituting the semiconductor lasers 101a to 101e and the convex lenses 102a to 102e in the illumination apparatus 100 of Embodiment 1 with the semiconductor lasers 401a to 401c and the convex lenses 402a to 402c in the illumination apparatus 400 of Embodiment 4.

Accordingly, as in the illumination apparatus 400 of Embodiment 4, blue excitation light emitted from the semiconductor lasers 401a to 401c is used as one component of white illumination light including fluorescence in the illumination apparatus 600 of this embodiment.

Figure 12A:
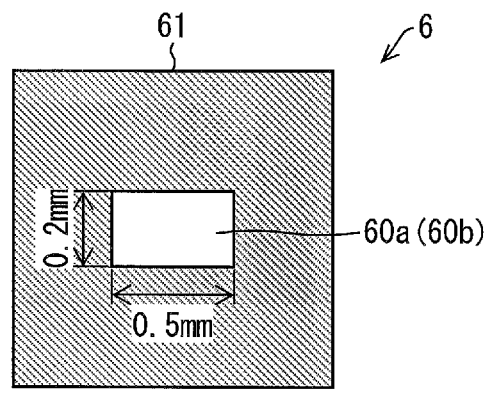
FIG. 12A is a top view of a fluorescence emitting section according to Embodiment 6 of the present disclosure.
Figure 12B:
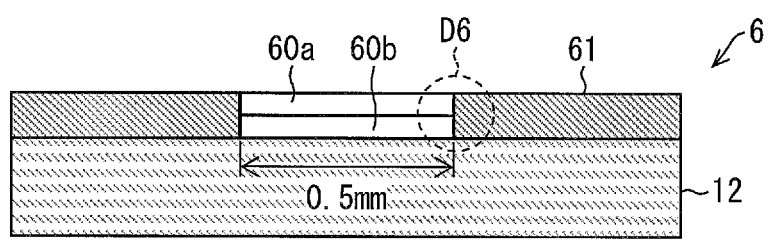
FIG. 12B is a cross-sectional side view of the fluorescence emitting section.
Figure 12C:
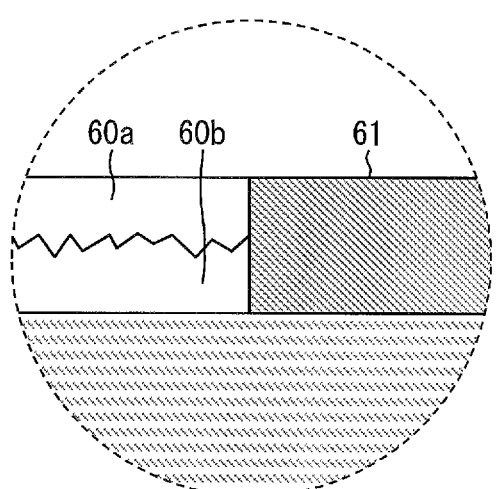
FIG. 12C is an enlarged view of a part of the cross-sectional side view illustrated in FIG. 12B.

FIGS. 12A to 12C are diagrams showing a structure of the fluorescence emitting section 6. FIG. 12A is a top view of the fluorescence emitting section 6. FIG. 12B is a cross-sectional side view of the fluorescence emitting section 6. FIG. 12C is an enlarged view of a part (D6) of the cross-sectional side view illustrated in FIG. 12B.

The fluorescence emitting section 6 includes a scattering layer 60a and a phosphor layer 60b, as illustrated in FIG.

12B. The scattering layer 60a and the phosphor layer 60b are stacked in order from the upper side of the fluorescence emitting section 6.

Here, the upper side means a side of a surface from which the illumination light including fluorescence is mostly emitted in the fluorescence emitting section 6. In the illumination apparatus 600, the reflector 106 is provided which faces the scattering layer 60a which is the top layer of the fluorescence emitting section 6, and serves as the optical transmission system.

The scattering layer 60a includes a TiO$_2$ particle (scatterer particle). The scattering layer 60a has an average layer thickness of 20 μm.

The phosphor layer 60b includes a yellow light emitting phosphor particle (YAG: Ce phosphor). The phosphor layer 60b has an average layer thickness of 40 μm. YAG: Ce phosphor emits yellow fluorescence with a peak wavelength of about 490 nm.

As described above, single scatterer particles are included in the scattering layer 60a. Single phosphor particles are included in the phosphor layer 60b.

The scatterer particles having a diameter of about 1 μm or less with each other, or the scatterer particle with a base material are bound by using a binder material made of SiO$_2$ or TiO$_2$ in the scattering layer 60a. The phosphor particles having a diameter of about 10 μm or less, with each other, or the phosphor particle with a base material, are bound by using a binder material made of SiO$_2$ or TiO$_2$ in the phosphor layer 60b.

The scattering layer 60a and the phosphor layer 60b are manufactured not to include organic substances in order to reduce property degradation due to irradiation with the excitation light.

The scattering layer 60a has an average layer thickness larger than the diameter of the scatterer particles included therein. The phosphor layer 60b has an average layer thickness larger than the diameter of the phosphor particles included therein.

The scattering layer 60a and the phosphor layer 60b are configured such that it is difficult to see the phosphor layer 60b as a lower layer from the scattering layer 60a as an upper layer. For example, as illustrated in FIG. 12A, only the scattering layer 60a is seen, and the phosphor layer 60b is not seen when the scattering layer 60a is viewed from the upper side.

In other words, the phosphor layer 60b as a lower layer is completely covered by the scattering layer 60a as the top layer. Accordingly, the phosphor particles included in the phosphor layer 60b are not seen through a gap between the scatterer particles included in the scattering layer 60a. Here, the scatterer particles are arranged in the scattering layer 60a, and the phosphor particles are arranged in the phosphor layer 60b such that it is difficult to see the phosphor layer 60b as a lower layer from the scattering layer 60a as the top layer.

As illustrated in FIG. 12A, the scattering layer 60a and the phosphor layer 60b have a rectangular shape of 0.2 mm×0.5 mm.

As illustrated in FIG. 12B, side surfaces (circumference) of the scattering layer 60a and the phosphor layer 60b are covered by an absorptive member (shielding member) 61. FIG. 12C is an enlarged view of a region D6 in the vicinity of an interface between (i) the scattering layer 60a and the phosphor layer 60b and (ii) the absorptive member 61 in FIG. 12B.

The absorptive member 61 is a black member including carbon. The scattering layer 60a, the phosphor layer 60b, and the absorptive member 61 are formed on a surface of the metal substrate 12 which is similar to that in Embodiment 1.

As illustrated in FIG. 12C, an uneven structure with Ra=1 μm, approximately, is provided on an interface between the scattering layer 60a and the phosphor layer 60b.

The uneven structure is present on the interface between the scattering layer 60a and the phosphor layer 60b, and thus the effect is achieved in which fluorescence incident from the phosphor layer 60b is further uniformly distributed in the scattering layer 60a, similarly to the fluorescence emitting section 2 of Embodiment 2.

The scattering layer 60a is irradiated with the excitation light emitted from the semiconductor lasers 401a to 401c, and thus the excitation light is scattered in the scattering layer 60a, and the phosphor particles included in the phosphor layer 60b are excited.

Accordingly, (i) blue excitation light scatter-reflected in the upper surface of the scattering layer 60a, and (ii) yellow fluorescence emitted from the phosphor layer 60b are mixed to obtain uniform white light in the process of being emitted from the upper surface of the fluorescence emitting section 6 and reaching the eyes of an observer. The white light is used as illumination light emitted from the illumination apparatus 600. The upper surface of the scattering layer 60a means a surface that constitutes the upper surface of the fluorescence emitting section 6.

The configuration of the illumination apparatus 600 can also be explained as follows.

That is, a light source device according to an aspect of the present disclosure includes a light emitting section in which a first layer and a second layer are stacked, the first layer includes a scatterer particle which scatters light, and the second layer includes a phosphor particle which receives excitation light and emits fluorescence. Light including fluorescence respectively emitted by the phosphor particles is emitted as illumination light, a surface of the light emitting section from which the illumination light is mostly emitted is set to an upper surface, and a shielding member is formed on a side surface with respect to the upper surface of the light emitting section, and reduces leakage of the fluorescence from the side surface.

According to the illumination apparatus 600 of this embodiment, as in the illumination apparatus 100 of Embodiment 1, it is possible to uniformly and economically take the white light out as illumination light having suppressed variation from the upper surface of the fluorescence emitting section 6.

In the fluorescence emitting section 6, the side surfaces of the scattering layer 60a and the phosphor layer 60b are covered by the absorptive member 61. Thus, it is possible to absorb the fluorescence which is emitted to the side surface of the phosphor layer 60b.

Accordingly, in an end portion of the fluorescence emitting section 6, that the occurrence of the fluorescence with different colors being separately emitted from the side surfaces of the scattering layer 60a and the phosphor layer 60b is reduced, and a light-emitting form of the fluorescence emitting section 6 is a desired form.

When irradiation of the excitation light is performed outside of a region of the scattering layer 60a, the excitation light is absorbed in the upper surface of the absorptive member 61. Accordingly, it is possible to reduce excessive scattering or reflection of the excitation light and to further suppress variation of the illumination light on the upper surface of the fluorescence emitting section 6.

A light source device (illumination apparatus 100) according to Aspect 1 of the present disclosure includes a light emitting section (fluorescence emitting section 1) in which a first layer (phosphor layer 30a) and a second layer (phosphor layer 30b) are stacked, the first layer including a first phosphor particle which receives excitation light and emits fluorescence with a first peak wavelength, and the second layer including a second phosphor particle which receives excitation light and emits fluorescence with a second peak wavelength. In the light source device, light is emitted as illumination light, which includes the fluorescence respectively emitted by the first phosphor particle and the second phosphor particle, a surface of the light emitting section from which the illumination light is mostly emitted is set to an upper surface, and a shielding member (reflective member 11) is provided on a side surface with respect to the upper surface of the light emitting section, and reduces leakage of the fluorescence from the side surface.

In this case, when the light emitting section is a reflection type light emitting section, the first layer and the second layer respectively emit fluorescence with a first peak wavelength and a second peak wavelength which are one wavelength component, as the fluorescence constituting the illumination light. It is possible that, among the first layer and second layer, the fluorescence emitted from the layer far from the upper surface of the light emitting section is scattered in the layer close to the upper surface of the light emitting section.

This applies to both a reflection type light emitting section and a transmission type light emitting section. The reflection type light emitting section means a light emitting section in which a surface on which excitation light is primarily incident is the same as a surface from which fluorescence is primarily emitted to the outside. The transmission type light emitting section means a light emitting section in which a surface on which excitation light is primarily incident faces a surface of which fluorescence is primarily emitted to the outside.

The shielding member is provided, and thus the occurrence of the fluorescence being emitted outwardly from the side surface of the light emitting section, and the fluorescence with different colors being separately emitted from the side surfaces of the first layer and the second layer in the end portion of the light emitting section is reduced. It is possible that a light emitting form of the light emitting section is a desired form.

Accordingly, when the light emitting section is viewed from the upper surface thereof, the illumination light is observed which is obtained by almost uniformly mixing the fluorescence with the first peak wavelength and the fluorescence with the second peak wavelength. Accordingly, it is possible to uniformly take out the illumination light emitted from the upper surface of the light emitting section, and the effect is achieved by which it is possible to obtain the illumination light having suppressed variation.

According to Aspect 2 of the present disclosure, in the light source device of Aspect 1, the shielding member may be a reflective member which reflects the fluorescence emitted from the side surface toward the inside of the light emitting section.

In this case, the reflective member reflects a part of the fluorescence emitted from the side surface of the light emitting section toward the upper surface of the light emitting section which emits the illumination light. Accordingly, the effect is achieved in which the luminous efficiency of the light emitting section is improved.

According to Aspect 3 of the present disclosure, in the light source device of Aspect 1 or Aspect 2, an uneven structure may be formed on the upper surface of the first layer, which scatters the fluorescence.

In this case, in the first layer, the fluorescence with the first peak wavelength and the fluorescence with the second peak wavelength are diffused from a surface closest to the upper surface of the light emitting section (that is, the upper surface of the first layer) in different directions according to the peak wavelengths thereof. Accordingly, the effect is achieved in which it is possible to further uniformly mix the fluorescence included in the illumination light.

According to Aspect 4 of the present disclosure, in the light source device of any one of Aspect 1 to Aspect 3, an uneven structure may be formed on an interface between the first layer and the second layer, which scatters the fluorescence.

In this case, the fluorescence emitted from the second layer to the first layer is scattered on the interface between the first layer and the second layer.

Accordingly, it is possible to allow the fluorescence emitted from the second layer to be incident on the first layer regardless of the arrangement of the second phosphor particles included in the second layer. The effect is achieved in which the fluorescence included in the illumination light is further uniformly mixed.

According to Aspect 5 of the present disclosure, in the light source device of any one of Aspect 1 to Aspect 4, gaps (30ah) may be provided between a plurality of first phosphor particles included in the first layer.

In this case, a large difference in refraction index occurs in an interface between the gaps and the first phosphor particles. Thus, in the interface, scattering or refracting of fluorescence emitted in the first layer occurs due to the difference in refraction index. Thus, the effect is achieved in which mixture of the fluorescence is facilitated in the light emitting section.

According to Aspect 6 of the present disclosure, in the light source device of any one of Aspect 1 to Aspect 5, gaps (30bh) may be provided between a plurality of second phosphor particles included in the second layer.

In this case, as in the above-mentioned aspects, scattering or refracting of fluorescence emitted in the second layer occurs due to the difference in the refraction index. Thus, the effect is achieved by which mixture of the fluorescence is facilitated in the light emitting section.

According to Aspect 7 of the present disclosure, in the light source device of any one of Aspect 1 to Aspect 6, the first layer may include a scatterer particle which scatters the fluorescence.

In this case, the effect is achieved in which mixture of the fluorescence is facilitated in the light emitting section.

According to Aspect 8 of the present disclosure, in the light source device of any one of Aspect 1 to Aspect 7, the first layer may be the phosphor layer closest to the upper surface of the light emitting section, and the first layer may have a thickness larger than that of the second layer.

In this case, it is possible to facilitate scattering of the fluorescence with the second peak wavelength which is emitted from the second layer in the first layer that is a phosphor layer closest to the upper surface of the light emitting section. Thus, the effect is achieved by which mixture of the fluorescence is facilitated in the light emitting section.

According to Aspect 9 of the present disclosure, in the light source device of any one of Aspect 1 to Aspect 8, the first layer may be the phosphor layer closest to the upper surface of the light emitting section, and the volume fraction of the first phosphor particles in the first layer may be larger than that of the second phosphor particles in the second layer.

In this case, as in the above-mentioned aspects, it is possible to facilitate the scattering of the fluorescence with the second peak wavelength which is emitted from the second layer in the first layer. Thus the effect is achieved in which mixture of the fluorescence is facilitated in the light emitting section.

According to Aspect 10 of the present disclosure, in the light source device of any one of Aspect 1 to Aspect 9, the first layer may be the phosphor layer closest to the upper surface of the light emitting section, and the first peak wavelength may be shorter than the second peak wavelength.

In this case, the effect is achieved in which it is possible to suppress loss in association with self-absorption of the fluorescence in the first layer and the second layer.

According to Aspect 11 of the present disclosure, in the light source device of any one of Aspect 1 to Aspect 10, the illumination light may further include the excitation light as visible light.

In this case, the effect is achieved in which it is possible to use the excitation light serving as the visible light and as one component of the illumination light which includes the fluorescence.

According to Aspect 12 of the present disclosure, in the light source device of any one of Aspect 1 to Aspect 11, in the light emitting section, a surface on which the excitation light is mostly incident may be the same as a surface from which the fluorescence is mostly emitted to the outside.

In this case, the effect is achieved in which it is possible to realize the light emitting section by constituting a reflection type light emitting section. It is possible to realize the light emitting section with improved luminous efficiency and heat-radiating properties by constituting a reflection type light emitting section.

According to Aspect 13 of the present disclosure, in the light source device of any one of Aspect 1 to Aspect 11, in the light emitting section, a surface on which the excitation light is mostly incident may face a surface from which the fluorescence is mostly emitted to the outside.

In this case, the effect is achieved in which it is possible to realize the light emitting section by constituting a transmission type light emitting section.

According to Aspect 14 of the present disclosure, in the light source device of any one of Aspect 1 to Aspect 13, the shielding member may include an absorptive member (41b) for absorbing the excitation light.

In this case, even when irradiation of the excitation light is performed out of the first layer, the excitation light is absorbed by the absorptive member. Thus, the effect is achieved that it is possible to reduce excessive scattering or reflection of the excitation light and to further suppress variation of the illumination light on the upper surface of the light emitting section.

An illumination apparatus (100) according to Aspect 15 of the present disclosure may include the light source device according to any one of Aspect 1 to Aspect 14, an excitation light source (semiconductor lasers 101a to 101e) which emits excitation light, and an optical transmission system (reflector 106) which transmits the illumination light in a predetermined direction.

In this case, the effect is achieved by which it is possible to realize the illumination apparatus capable of transmitting the illumination light in the predetermined direction by using the optical transmission system, and the illumination light obtained by irradiating the light emitting section of the light source device with the excitation light emitted from the excitation light source. The illumination apparatus may be used in, for example, a vehicle headlight, a spotlight or the like.

The present technology is not limited to the above-described embodiments, can be variously changed in the scope of claims, and embodiments obtained by appropriate combinations of technical means disclosed in the different embodiments are included in the technical scope of the present disclosure. Furthermore, new technical characteristics can be formed by combinations of the technical means disclosed in the respective embodiments.

The present disclosure can be explained as follows.

That is, a light source device according to an aspect of the present disclosure is an illumination apparatus including a semiconductor laser element as an excitation light source, and a light emitting section having phosphor particles. The light emitting section is formed by stacking a layer A including one type of phosphor particles A and a layer B including one type of phosphor particles B other than the phosphor particles A. In the light emitting section, fluorescence which is emitted from the phosphor particles and brought outwardly from the layer A is used as illumination light, the entire surface of the layer A is excited by excitation light, and an side surface of the light emitting section is not exposed outside the light emitting section.

In the light source device according to an aspect of the present disclosure, a member is provided which abuts the side surface of the light emitting section, and reflects the fluorescence emitted from the light emitting section.

In the light source device according to an aspect of the present disclosure, a member is provided which absorbs the excitation light in the circumference of the light emitting section.

In the light source device according to an aspect of the present disclosure, an uneven structure with $Ra=1$ μm or more is provided on the top layer of the light emitting section.

In the light source device according to an aspect of the present disclosure, gaps are provided in the light emitting section.

In the light source device according to an aspect of the present disclosure, an uneven structure with $Ra=1$ μm or more is provided on an interface between a plurality of phosphor layers.

In the light source device according to an aspect of the present disclosure, phosphor particles and scatterer particles are included in the top layer.

In the light source device according to an aspect of the present disclosure, the top layer is thickest.

An illumination apparatus according to an aspect of the present disclosure includes the light source device according to an aspect of the present disclosure, and an optical transmission system in which a light source image on the surface of a fluorescence emitting section is enlarged and projected in the light source device.

The present disclosure can be used in a light source device and an illumination apparatus including the light source device.

The present disclosure contains subject matter related to that disclosed in Japanese Priority Patent Application JP 2014-043162 filed in the Japan Patent Office on Mar. 5, 2014, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light source device comprising:
a light emitting section formed by stacking a first layer and a second layer, the first layer including a first phosphor particle which receives excitation light and emits fluorescence with a first peak wavelength, and the second layer including a second phosphor particle which receives the excitation light and emits fluorescence with a second peak wavelength different from the first peak wavelength, wherein
light including the fluorescence emitted by the first phosphor particle and the fluorescence emitted by the second phosphor particle is emitted as illumination light,
a surface of the light emitting section from which the illumination light is mostly emitted is defined as an upper surface, and
a shielding member is provided on a side surface with respect to the upper surface of the light emitting section, and reduces leakage of fluorescence from the side surface.

2. The light source device according to claim 1, wherein the shielding member is a reflective member which reflects the fluorescence emitted from the side surface toward the inside of the light emitting section.

3. The light source device according to claim 1, wherein an uneven structure, which scatters fluorescence, is formed on an upper surface of the first layer.

4. The light source device according to claim 1, wherein an uneven structure, which scatters fluorescence, is formed on an interface between the first layer and the second layer.

5. The light source device according to claim 1, wherein gaps are provided between a plurality of first phosphor particles included in the first layer.

6. The light source device according to claim 1, wherein gaps are provided between a plurality of second phosphor particles included in the second layer.

7. The light source device according to claim 1, wherein the first layer includes a scatterer particle which scatters the fluorescence.

8. The light source device according to claim 1, wherein the first layer is a phosphor layer which is closest to the upper surface of the light emitting section, and the first layer has a thickness larger than the thickness of the second layer.

9. The light source device according to claim 1, wherein the first layer is a phosphor layer which is closest to the upper surface of the light emitting section, and the volume fraction of first phosphor particles in the first layer is larger than the volume fraction of second phosphor particles in the second layer.

10. The light source device according to claim 1, wherein the first layer is a phosphor layer which is closest to the upper surface of the light emitting section, and the first peak wavelength is shorter than the second peak wavelength.

11. The light source device according to claim 1, wherein the illumination light further includes the excitation light as visible light.

12. The light source device according to claim 1, wherein a surface on which the excitation light is mostly incident is the same as a surface from which fluorescence is mostly emitted to the outside in the light emitting section.

13. The light source device according to claim 1, wherein a surface on which the excitation light is mostly incident faces a surface from which the fluorescence is mostly emitted to the outside in the light emitting section.

14. The light source device according to claim 1, wherein the shielding member includes an absorptive member for absorbing the excitation light.

15. An illumination apparatus comprising:
the light source device according to claim 1;
an excitation light source for emitting excitation light; and
an optical transmission system for transmitting illumination light in a predetermined direction.

* * * * *